United States Patent
Lu

(10) Patent No.: US 10,318,530 B1
(45) Date of Patent: Jun. 11, 2019

(54) ITERATIVE KURTOSIS CALCULATION FOR BIG DATA USING COMPONENTS

(71) Applicant: Jizhu Lu, Redmond, WA (US)

(72) Inventor: Jizhu Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 520 days.

(21) Appl. No.: 14/964,335

(22) Filed: Dec. 9, 2015

Related U.S. Application Data

(60) Provisional application No. 62/089,233, filed on Dec. 9, 2014.

(51) Int. Cl.
  *G06F 17/18* (2006.01)
  *G06F 17/30* (2006.01)
  *G06F 16/2453* (2019.01)

(52) U.S. Cl.
  CPC .......... *G06F 16/2453* (2019.01); *G06F 17/18* (2013.01)

(58) Field of Classification Search
  CPC ............... G06F 17/30463; G06F 17/30395
  USPC ......................................................... 707/719
  See application file for complete search history.

(56) References Cited

U.S. PATENT DOCUMENTS

| | | | |
|---|---|---|---|
| 7,747,413 B2 | 6/2010 | Ramsey et al. | |
| 7,840,377 B2 | 11/2010 | Ramsey et al. | |
| 9,069,726 B2* | 6/2015 | Lu | H04L 65/60 |
| 9,430,444 B2* | 8/2016 | Lu | H04L 65/60 |
| 2014/0164456 A1* | 6/2014 | Lu | G06F 17/18 |
| | | | 708/200 |

FOREIGN PATENT DOCUMENTS

| WO | WO-2014093540 A2 | 6/2014 |
|---|---|---|
| WO | WO-2014093540 A3 | 9/2014 |

* cited by examiner

*Primary Examiner* — Jean B Fleurantin

(57) ABSTRACT

The present invention extends to methods, systems, and computing system program products for iteratively calculating kurtosis for Big Data. Embodiments of the invention include iteratively calculating one or more components of a kurtosis in a modified computation subset based on the one or more components of the kurtosis calculated for a previous computation subset and then calculating the kurtosis based on the iteratively calculated components. Iteratively calculating kurtosis avoids visiting all data elements in the modified computation subset and performing redundant computations thereby increasing calculation efficiency, saving computing resources and reducing computing system's power consumption.

20 Claims, 23 Drawing Sheets

The Definition of Kurtosis:

Suppose there is a computation subset $X$ composed of $n$ data elements: $X = \{x_i | i = 1, \ldots, n\}$ which is a subset of a Big Data set.

Define the sum of $X$ with size $n$ in the $k^{th}$ iteration as below:

$$S_k = x_1 + x_2 + x_3 + \cdots + x_n = \sum_1^n x_i \qquad \diagdown\!\!\!\diagup 401$$

Define the mean of $X$ with size $n$ in the $k^{th}$ iteration as below:

$$\bar{x}_k = \frac{(x_1+x_2+x_3+\cdots+x_n)}{n} = \frac{\sum_1^n x_i}{n} \qquad \diagdown\!\!\!\diagup 402$$

The kurtosis of the computation subset $X$ in the $k^{th}$ iteration is defined as $\gamma_k^{(2)}$:

$$\gamma_k^{(2)} = \frac{\frac{1}{n}\sum_1^n(x_i-\bar{x}_k)^4}{\left(\frac{1}{n}\sum_1^n(x_i-\bar{x}_k)^2\right)^2} = \frac{n\sum_1^n(x_i-\bar{x}_k)^4}{(\sum_1^n(x_i-\bar{x}_k)^2)^2} \qquad \diagdown\!\!\!\diagup 403$$

Suppose $\gamma_k^{(2)}$ has already been calculated, and the kurtosis of the computation subset $X$ with a fixed size $n$ needs to be calculated again after an existing data element $x_r (1 \leq r \leq n)$ in $X$ is removed and a data element $x_a$ is added. Define the modified computation subset as $X'$.

Define the sum of the data elements in $X'$ with size $n$ in the $k+1^{th}$ iteration as below:

$$S_{k+1} = x_1 + x_2 + x_3 + \cdots + x_n + x_a - x_r = \sum_1^n x_i + x_a - x_r \qquad \diagdown\!\!\!\diagup 404$$

Define the mean of the data elements in $X'$ in the $k+1^{th}$ iteration as below:

$$\bar{x}_{k+1} = \frac{(x_1+x_2+\cdots+x_n+x_a-x_r)}{n} = \frac{\sum_1^n x_i + x_a - x_r}{n} \qquad \diagdown\!\!\!\diagup 405$$

The kurtosis of the data elements in $X'$ in the $k+1^{th}$ iteration is defined as $\gamma_{k+1}^{(2)}$:

$$\gamma_{k+1}^{(2)} = \frac{\frac{1}{n}(\sum_1^n(x_i-\bar{x}_{k+1})^4+(x_a-\bar{x}_{k+1})^4-(x_r-\bar{x}_{k+1})^4)}{\left(\frac{1}{n}(\sum_1^n(x_i-\bar{x}_{k+1})^2+(x_a-\bar{x}_{k+1})^2-(x_r-\bar{x}_{k+1})^2)\right)^2} = \frac{n(\sum_1^n(x_i-\bar{x}_{k+1})^4+(x_a-\bar{x}_{k+1})^4-(x_r-\bar{x}_{k+1})^4)}{(\sum_1^n(x_i-\bar{x}_{k+1})^2+(x_a-\bar{x}_{k+1})^2-(x_r-\bar{x}_{k+1})^2)^2} \qquad \diagdown\!\!\!\diagup 406$$

The subscription $k+1$ of $\bar{x}_{k+1}$ and $\gamma_{k+1}^{(2)}$ indicates the order of iteration.

Fig. 4A

Some Example Components of a Kurtosis:

- $S_k = \sum_1^n x_i$
- $\bar{x}_k = \frac{S_k}{n} = \frac{1}{n}\sum_1^n x_i$
- $SS_k = \sum_1^n x_i^2$
- $SX_k = \sum_1^n (x_i - \bar{x}_k)^2$
- $CS_k = \sum_1^n x_i^3$
- $CX_k = \sum_1^n (x_i - \bar{x}_k)^3$
- $QS_k = \sum_1^n x_i^4$
- $QX_k = \sum_1^n (x_i - \bar{x}_k)^4$
- $\frac{1}{n}\sum_1^n (x_i - \bar{x}_k)^2$
- $\frac{1}{n}\sum_1^n (x_i - \bar{x}_k)^3$
- $\frac{1}{n}\sum_1^n (x_i - \bar{x}_k)^4$
- $\left(\frac{1}{n}\sum_1^n (x_i - \bar{x}_k)^2\right)^2$
- $\gamma_k^{(2)} = \frac{n\sum_1^n(x_i-\bar{x}_k)^4}{(\sum_1^n(x_i-\bar{x}_k)^2)^2}$ Basic Iterative Component Calculation Equations:

The sum or mean of the data within a computation subset will be used by several examples of iterative algorithms described in the following sections, so put its calculation here instead of in each algorithms.

According to equation 401 and equation 404, $S_{k+1}$ can be calculated in an iterative way:

$$S_{k+1} = S_k + x_a - x_r \qquad \frown\!\!\smile 407$$

According to equation 402 and equation 405, $\bar{x}_{k+1}$ can be calculated in an iterative way:

$$\bar{x}_{k+1} = \bar{x}_k + \frac{(x_a - x_r)}{n} \qquad \frown\!\!\smile 408$$

Fig. 4B

Iterative Algorithm 1:

$SS_k = \sum_1^n x_i^2$  409

$SS_{k+1} = \sum_1^n x_i^2 + x_a^2 - x_r^2$  410

$SS_{k+1}$ can be calculated in an iterative way:

$SS_{k+1} = SS_k + x_a^2 - x_r^2$  411

$SX_k = \sum_1^n (x_i - \bar{x}_k)^2$  412

$SX_{k+1} = \sum_1^n (x_i - \bar{x}_{k+1})^2 + (x_a - \bar{x}_{k+1})^2 - (x_r - \bar{x}_{k+1})^2$  413

$SX_{k+1}$ can be calculated by using $SS_{k+1}$ and $S_{k+1}$ or $\bar{x}_{k+1}$ $SX_{k+1} = SS_{k+1} - S_{k+1}\bar{x}_{k+1} = SS_{k+1} - S_{k+1}^2/n = SS_{k+1} - n\bar{x}_{k+1}^2$  414

$CS_k = \sum_1^n x_i^3$  415

$CS_{k+1} = \sum_1^n x_i^3 + x_a^3 - x_r^3$  416

$CS_{k+1}$ can be calculated in an iterative way:

$CS_{k+1} = CS_k + x_a^3 - x_r^3$  417

$QX_k = \sum_1^n (x_i - \bar{x}_k)^4$  418

$QX_{k+1} = \sum_1^n (x_i - \bar{x}_{k+1})^4 + (x_a - \bar{x}_{k+1})^4 - (x_r - \bar{x}_{k+1})^4$  419

$QX_{k+1}$ can be calculated by using $S_k$ or $\bar{x}_k$, $S_{k+1}$ or $\bar{x}_{k+1}$, $SS_k$, $CS_k$ and $QX_k$:

$QX_{k+1} = QX_k + x_a^2((x_a - 2S_{k+1}/n)^2 + 2(S_{k+1}/n)^2) - x_r^2((x_r - 2S_{k+1}/n)^2 + 2(S_{k+1}/n)^2) - (S_{k+1} - S_k)\left(4CS_k + 3(S_{k+1} + S_k)\left((S_{k+1}^2 + S_k^2)/n - 2SS_k\right)/n\right)/n = QX_k + x_a^2((x_a - 2\bar{x}_{k+1})^2 + 2\bar{x}_{k+1}^2) - x_r^2((x_r - 2\bar{x}_{k+1})^2 + 2\bar{x}_{k+1}^2) - (\bar{x}_{k+1} - \bar{x}_k)\left(4CS_k + 3(\bar{x}_{k+1} + \bar{x}_k)((\bar{x}_{k+1}S_{k+1} + \bar{x}_kS_k) - 2SS_k)\right) = QX_k + x_a^2((x_a - 2\bar{x}_{k+1})^2 + 2\bar{x}_{k+1}^2) - x_r^2((x_r - 2\bar{x}_{k+1})^2 + 2\bar{x}_{k+1}^2) - (\bar{x}_{k+1} - \bar{x}_k)\left(4CS_k + 3(\bar{x}_{k+1} + \bar{x}_k)(n(\bar{x}_{k+1}^2 + \bar{x}_k^2) - 2SS_k)\right)$  420

The kurtosis can be calculated by using $QX_{k+1}$ and $SX_{k+1}$ $\gamma_{k+1}^{(2)} = \frac{nQX_{k+1}}{SX_{k+1}^2}$  421

Fig. 4C

Iterative Algorithm 2:

$SS_k = \sum_1^n x_i^2$  422

$SS_{k+1} = \sum_1^n x_i^2 + x_a^2 - x_r^2$  423

$SS_{k+1}$ can be calculated in an iterative way:

$SS_{k+1} = SS_k + x_a^2 - x_r^2$  424

$SX_k = \sum_1^n (x_i - \bar{x}_k)^2$  425

$SX_{k+1} = \sum_1^n (x_i - \bar{x}_{k+1})^2 + (x_a - \bar{x}_{k+1})^2 - (x_r - \bar{x}_{k+1})^2$  426

$SX_{k+1}$ can be calculated by using $SS_{k+1}$ and $S_{k+1}$ or $\bar{x}_{k+1}$ $SX_{k+1} = SS_{k+1} - S_{k+1}\bar{x}_{k+1} = SS_{k+1} - S_{k+1}^2/n = SS_{k+1} - n\bar{x}_{k+1}^2$  427

$CS_k = \sum_1^n x_i^3$  428

$CS_{k+1} = \sum_1^n x_i^3 + x_a^3 - x_r^3$  429

$CS_{k+1}$ can be calculated in an iterative way:

$CS_{k+1} = CS_k + x_a^3 - x_r^3$  430

$QS_k = \sum_1^n x_i^4$  431

$QS_{k+1} = \sum_1^n x_i^4 + x_a^4 - x_r^4$  432

$QS_{k+1}$ can be calculated in an iterative way:

$QS_{k+1} = QS_k + x_a^4 - x_r^4$  433

$QX_k = \sum_1^n (x_i - \bar{x}_k)^4$  434

$QX_{k+1} = \sum_1^n (x_i - \bar{x}_{k+1})^4 + (x_a - \bar{x}_{k+1})^4 - (x_r - \bar{x}_{k+1})^4$  435

$QX_{k+1}$ can be calculated by using $S_{k+1}$ or $\bar{x}_{k+1}$, $SS_{k+1}$, $CS_{k+1}$ and $QS_{k+1}$:

$QX_{k+1} = QS_{k+1} + (3S_{k+1}(2SS_{k+1} - S_{k+1}^2/n)/n - 4CS_{k+1})S_{k+1}/n = QS_{k+1} + (3\bar{x}_{k+1}(2SS_{k+1} - \bar{x}_{k+1}S_{k+1}) - 4CS_{k+1})\bar{x}_{k+1} = QS_{k+1} + (3\bar{x}_{k+1}(2SS_{k+1} - n\bar{x}_{k+1}^2) - 4CS_{k+1})\bar{x}_{k+1}$  436

The kurtosis can be calculated by using $QX_{k+1}$ and $SX_{k+1}$ $\gamma_{k+1}^{(2)} = \frac{nQX_{k+1}}{SX_{k+1}^2}$  437

Fig. 4D

Iterative Algorithm 3:

$SS_k = \sum_1^n x_i^2$ — 438

$SS_{k+1} = \sum_1^n x_i^2 + x_a^2 - x_r^2$ — 439

$SS_{k+1}$ can be calculated in an iterative way:

$SS_{k+1} = SS_k + x_a^2 - x_r^2$ — 440

$SX_k = \sum_1^n (x_i - \bar{x}_k)^2$ — 441

$SX_{k+1} = \sum_1^n (x_i - \bar{x}_{k+1})^2 + (x_a - \bar{x}_{k+1})^2 - (x_r - \bar{x}_{k+1})^2$ — 442

$SX_{k+1}$ can be calculated in an iterative way using $S_k$ or $\bar{x}_k$ and $S_{k+1}$ or $\bar{x}_{k+1}$:

$SX_{k+1} = SX_k + (x_a - x_r)((x_r + x_a) - (S_k + S_{k+1})/n) = SX_k + (x_a - x_r)((x_r + x_a) - (\bar{x}_k + \bar{x}_{k+1}))$

— 443

$CS_k = \sum_1^n x_i^3$ — 444

$CS_{k+1} = \sum_1^n x_i^3 + x_a^3 - x_r^3$ — 445

$CS_{k+1}$ can be calculated in an iterative way:

$CS_{k+1} = CS_k + x_a^3 - x_r^3$ — 446

$QS_k = \sum_1^n x_i^4$ — 447

$QS_{k+1} = \sum_1^n x_i^4 + x_a^4 - x_r^4$ — 448

$QS_{k+1}$ can be calculated in an iterative way:

$QS_{k+1} = QS_k + x_a^4 - x_r^4$ — 449

$QX_k = \sum_1^n (x_i - \bar{x}_k)^4$ — 450

$QX_{k+1} = \sum_1^n (x_i - \bar{x}_{k+1})^4 + (x_a - \bar{x}_{k+1})^4 - (x_r - \bar{x}_{k+1})^4$ — 451

$QX_{k+1}$ can be calculated by using $S_{k+1}$ or $\bar{x}_{k+1}$, $SS_{k+1}$, $CS_{k+1}$ and $QS_{k+1}$:

$QX_{k+1} = QS_{k+1} + (3S_{k+1}(2SS_{k+1} - S_{k+1}^2/n)/n - 4CS_{k+1})S_{k+1}/n = QS_{k+1} + (3\bar{x}_{k+1}(2SS_{k+1} - \bar{x}_{k+1}S_{k+1}) - 4CS_{k+1})\bar{x}_{k+1} = QS_{k+1} + (3\bar{x}_{k+1}(2SS_{k+1} - n\bar{x}_{k+1}^2) - 4CS_{k+1})\bar{x}_{k+1}$ — 452

The kurtosis can be calculated by using $QX_{k+1}$ and $SX_{k+1}$ $\gamma_{k+1}^{(2)} = \frac{nQX_{k+1}}{SX_{k+1}^2}$ — 453

Fig. 4E

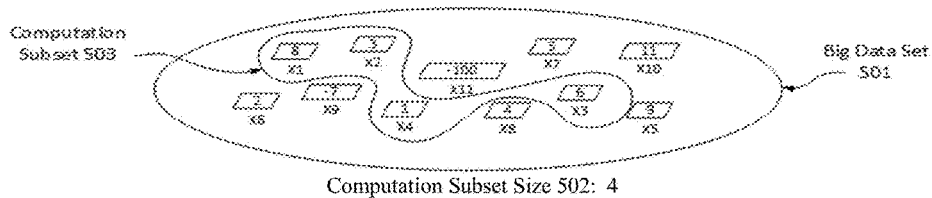

Computation Subset Size 502: 4

Calculate Kurtosis for Computation Subset 503

Traditional Algorithm:

1. Calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Calculate $\sum_1^4 (x_i - \bar{x}_1)^2$ for the 1st iteration:

$$\sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 4 multiplications, 3 additions, 4 subtractions

3. Calculate $(\sum_1^4 (x_i - \bar{x}_1)^2)^2$ for the 1st iteration:

$$(\sum_1^4 (x_i - \bar{x}_1)^2)^2 = (29)^2 = 841$$

Operations in this step: 1 multiplication

4. Calculate $\sum_1^4 (x_i - \bar{x}_1)^4$ for the 1st iteration:

$$\sum_1^4 (x_i - \bar{x}_1)^4 = (8 - 4.5)^4 + (3 - 4.5)^4 + (6 - 4.5)^4 + (1 - 4.5)^4 = 310.25$$

Operations in this step: 8 multiplications, 3 additions, 4 subtractions

5. Use equation 403 to calculate the kurtosis $\gamma_1^{(2)}$ for the 1st iteration:

$$\gamma_1^{(2)} = \frac{4 \sum_1^4 (x_i - \bar{x}_1)^4}{(\sum_1^4 (x_i - \bar{x}_1)^2)^2} = \frac{4 \times 310.25}{841} = \frac{1241}{841} = 1.4756242568370987$$

Operations in this step: 1 division, 1 multiplication

There are a total of 2 divisions, 14 multiplications, 9 additions and 8 subtractions.

Fig. 5A

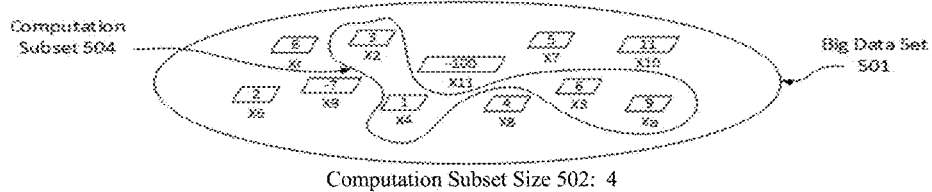

Computation Subset Size 502: 4

<u>Calculate Kurtosis for Computation Subset 504</u>

Traditional Algorithm:

1. Calculate $\bar{x}_2$ for the 2<sup>nd</sup> iteration:

$$\bar{x}_2 = \frac{3+6+1+9}{4} = \frac{19}{4} = 4.75$$

Operations in this step: 1 division, 3 additions

2. Calculate $\sum_2^4 (x_i - \bar{x}_2)^2 + (x_a - \bar{x}_2)^2$ for the 2<sup>nd</sup> iteration:

$$\sum\nolimits_2^4 (x_i - \bar{x}_2)^2 + (x_a - \bar{x}_2)^2 = (3 - 4.75)^2 + (6 - 4.75)^2 + (1 - 4.75)^2 + (9 - 4.75)^2 = 36.75$$

Operations in this step: 4 multiplications, 3 additions, 4 subtractions

3. Calculate $(\sum_2^4 (x_i - \bar{x}_2)^2 + (x_a - \bar{x}_2)^2)^2$ for the 2<sup>nd</sup> iteration:

$$(\sum\nolimits_2^4 (x_i - \bar{x}_2)^2 + (x_a - \bar{x}_2)^2)^2 = (36.75)^2 = 1350.5625$$

Operations in this step: 1 multiplication

4. Calculate $\sum_2^4 (x_i - \bar{x}_2)^4 + (x_a - \bar{x}_2)^4$ for the 2<sup>nd</sup> iteration:

$$\sum\nolimits_2^4 (x_i - \bar{x}_2)^4 + (x_a - \bar{x}_2)^4 = (3 - 4.75)^4 + (6 - 4.75)^4 + (1 - 4.75)^4 + (9 - 4.75)^4 =$$
$$9.37890625 + 2.44140625 + 197.75390625 + 326.25390625 = 535.828125$$

Operations in this step: 8 multiplications, 3 additions, 4 subtractions

5. Use equation 403 to calculate the kurtosis $\gamma_2^{(2)}$ for the 2<sup>nd</sup> iteration:

$$\gamma_2^{(2)} = \frac{4(\sum_2^4 (x_i - \bar{x}_2)^4 + (x_a - \bar{x}_2)^4)}{(\sum_2^4 (x_i - \bar{x}_2)^2 + (x_a - \bar{x}_2)^2)^2} = \frac{4 \times 535.828125}{1350.5625} = \frac{2143.3125}{1350.5625} = 1.586977648202138$$

Operations in this step: 1 division, 1 multiplication

There are a total of 2 divisions, 14 multiplications, 9 additions and 8 subtractions.

Fig. 5A Cont'd 1

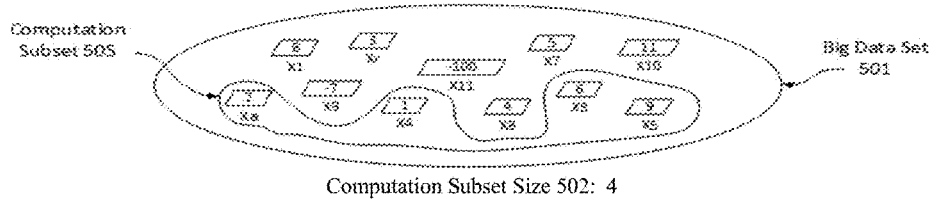

Computation Subset Size 502: 4

Calculate Kurtosis for Computation Subset 505

Traditional Algorithm:

1. Calculate $\bar{x}_3$ for the 3$^{rd}$ iteration:

$$\bar{x}_3 = \frac{6+1+9+2}{4} = \frac{18}{4} = 4.5$$

Operations in this step: 1 division, 3 additions

2. Calculate $\sum_3^5 (x_i - \bar{x}_3)^2 + (x_a - \bar{x}_3)^2$ for the 3$^{rd}$ iteration:

$$\sum_3^5 (x_i - \bar{x}_3)^2 + (x_a - \bar{x}_3)^2 = (6 - 4.5)^2 + (1 - 4.5)^2 + (9 - 4.5)^2 + (2 - 4.5)^2 = 41$$

Operations in this step: 4 multiplications, 3 additions, 4 subtractions

3. Calculate $\left(\sum_3^5 (x_i - \bar{x}_3)^2 + (x_a - \bar{x}_3)^2\right)^2$ for the 3$^{rd}$ iteration:

$$\left(\sum_3^5 (x_i - \bar{x}_3)^2 + (x_a - \bar{x}_3)^2\right)^2 = (41)^2 = 1681$$

Operations in this step: 1 multiplication

4. Calculate $\sum_3^5 (x_i - \bar{x}_3)^4 + (x_a - \bar{x}_3)^4$ for the 3$^{rd}$ iteration:

$$\sum_3^5 (x_i - \bar{x}_3)^4 + (x_a - \bar{x}_3)^4 = (6 - 4.5)^4 + (1 - 4.5)^4 + (9 - 4.5)^4 + (2 - 4.5)^4 = 604.25$$

Operations in this step: 8 multiplications, 3 additions, 4 subtractions

5. Use equation 403 to calculate the kurtosis $\gamma_3^{(2)}$ for the 3$^{rd}$ iteration:

$$\gamma_3^{(2)} = \frac{4\left(\sum_3^5 (x_i - \bar{x}_3)^4 + (x_a - \bar{x}_3)^4\right)}{\left(\sum_3^5 (x_i - \bar{x}_3)^2 + (x_a - \bar{x}_3)^2\right)^2} = \frac{4 \times 604.25}{1681} = \frac{2417}{1681} = 1.4378346222486615$$

Operations in this step: 1 division, 1 multiplication

There are a total of 2 divisions, 14 multiplications, 9 additions and 8 subtractions.

Traditional algorithms for calculating kurtosis on $n$ data elements will typically take 2 divisions, $3n+2$ multiplications, $3(n-1)$ additions and $2n$ subtractions without any optimization.

Fig. 5A Cont'd 2

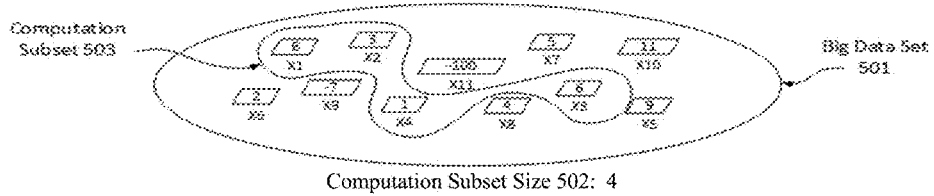

Computation Subset Size 502: 4

Calculate Kurtosis for Computation Subset 503

Iterative Algorithm 1:

1. Calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 409 to calculate $SS_1$ for the 1st iteration:

$$SS_1 = \sum_1^4 x_i^2 = 8^2 + 3^2 + 6^2 + 1^2 = 64 + 9 + 36 + 1 = 110$$

Operations in this step: 4 multiplications, 3 additions

3. Use equation 412 to calculate $SX_1$ for the 1st iteration:

$$SX_1 = \sum_1^4 (x_i - \bar{x}_1)^2 = (8 - 4.5)^2 + (3 - 4.5)^2 + (6 - 4.5)^2 + (1 - 4.5)^2 = 12.25 + 2.25 + 2.25 + 12.25 = 29$$

Operations in this step: 4 multiplications, 3 additions, 4 subtractions

4. Use equation 415 to calculate $CS_1$ for the 1st iteration:

$$CS_1 = \sum_1^4 x_i^3 = 8^3 + 3^3 + 6^3 + 1^3 = 512 + 27 + 216 + 1 = 756$$

Operations in this step: 8 multiplications, 3 additions

5. Use equation 418 to calculate $QX_1$ for the 1st iteration:

$$QX_1 = \sum_1^4 (x_i - \bar{x}_1)^4 = (8 - 4.5)^4 + (3 - 4.5)^4 + (6 - 4.5)^4 + (1 - 4.5)^4 = 310.25$$

Operations in this step: 8 multiplications, 3 additions, 4 subtractions

6. Use equation 421 to calculate the kurtosis $\gamma_1^{(2)}$ for the 1st iteration:

$$\gamma_1^{(2)} = \frac{4QX_1}{SX_1^2} = \frac{4 \times 310.25}{29^2} = \frac{1241}{841} = 1.4756242568370987$$

Operations in this step: 1 division, 2 multiplications

There are a total of 2 divisions, 26 multiplications, 15 additions and 8 subtractions.

Fig. 5B

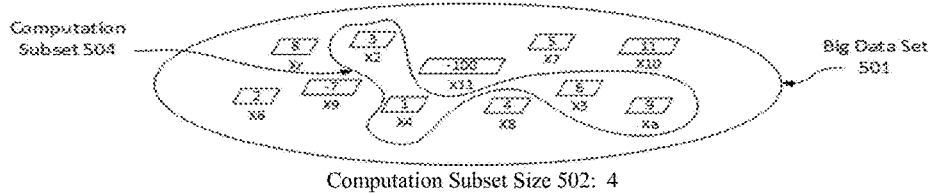

Computation Subset Size 502: 4

Calculate Kurtosis for Computation Subset 504

Iterative Algorithm 1:

1. Use equation 408 to calculate $\bar{x}_2$ for the 2nd iteration:

$$\bar{x}_2 = \bar{x}_1 + \frac{(x_a - x_r)}{4} = 4.5 + \frac{(9-8)}{4} = 4.5 + \frac{1}{4} = 4.75,$$

Operations in this step: 1 division, 1 addition, 1 subtraction

2. Calculate $x_r^2$, $x_a^2$ and $\bar{x}_2^2$ and store them for future calculation $$x_r^2 = 8 \times 8 = 64, \quad x_a^2 = 9 \times 9 = 81, \quad \bar{x}_2^2 = 4.75^2 = 22.5625$$

Operations in this step: 3 multiplications

3. Use equation 411 to calculate $SS_2$ and equation 414 to calculate $SX_2$ for the 2nd iteration:

$$SS_2 = SS_1 + x_a^2 - x_r^2 = 110 + 81 - 64 = 127$$

$$SX_2 = SS_2 - 4\bar{x}_2^2 = 127 - 4 \times 22.5625 = 36.75$$

Operations in this step: 1 multiplication, 1 addition, 2 subtractions

4. Use equation 417 to calculate $CS_2$ for the 2nd iteration:

$$CS_2 = CS_1 + x_a^3 - x_r^3 = 756 + 9^3 - 8^3 = 756 + 729 - 512 = 973$$

Operations in this step: 2 multiplications, 1 addition, 1 subtraction (use $x_a^2$, $x_r^2$ calculated in step 2)

5. Use equation 420 to calculate $QX_2$ for the 2nd iteration:

$$\begin{aligned} QX_2 &= QX_1 + x_a^2\left((x_a - 2\bar{x}_2)^2 + 2\bar{x}_2^2\right) - x_r^2\left((x_r - 2\bar{x}_2)^2 + 2\bar{x}_2^2\right) \\ &\quad - (\bar{x}_2 - \bar{x}_1)\left(4CS_1 + 3(\bar{x}_2 + \bar{x}_1)(4 \times (\bar{x}_2^2 + \bar{x}_1^2) - 2SS_1)\right) \\ &= 310.25 + 9^2((9 - 2 \times 4.75)^2 + 2 \times 4.75^2) - 8^2((8 - 2 \times 4.75)^2 + 2 \times 4.75^2) \\ &\quad - (4.75 - 4.5)(4 \times 756 + 3(4.75 + 4.5)(4 \times (4.75^2 + 4.5^2) - 2 \times 110)) \\ &= 310.25 + 3675.375 - 3032 - 417.796875 = 535.828125 \end{aligned}$$

Operations in this step: 14 multiplications, 6 additions, 6 subtractions

6. Use equation 421 to calculate the kurtosis $\gamma_2^{(2)}$ for the 2nd iteration:

$$\gamma_2^{(2)} = \frac{4QX_2}{SX_2^2} = \frac{4 \times 535.828125}{36.75^2} = \frac{2143.3125}{1350.5625} = 1.586977648202138$$

Operations in this step: 1 division, 2 multiplications

There are a total of 2 divisions, 22 multiplications, 9 additions and 10 subtractions.

Fig. 5B Cont'd 1

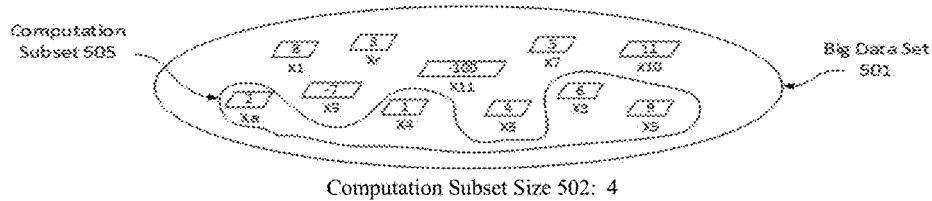

Computation Subset Size 502: 4

<u>Calculate Kurtosis for Computation Subset 505</u>

Iterative Algorithm 1:

1. Use equation 408 to calculate $\bar{x}_3$ for the 3rd iteration:

$$\bar{x}_3 = \bar{x}_2 + \frac{(x_a - x_r)}{4} = 4.75 + \frac{(2-3)}{4} = 4.5$$

Operations in this step: 1 division, 1 addition, 1 subtraction

2. Calculate $x_r^2$, $x_a^2$ and $\bar{x}_3^2$ and store them for future calculation $$x_r^2 = 3 \times 3 = 9, \quad x_a^2 = 2 \times 2 = 4, \quad \bar{x}_3^2 = 4.5 \times 4.5 = 20.25$$

Operations in this step: 3 multiplications

3. Use equation 411 to calculate $SS_3$ and equation 414 to calculate $SX_3$ for the 3rd iteration:

$$SS_3 = SS_2 + x_a^2 - x_r^2 = 127 + 4 - 9 = 122$$

$$SX_3 = SS_3 - 4\bar{x}_3^2 = 122 - 4 \times 4.5^2 = 41$$

Operations in this step: 1 multiplication, 1 addition, 2 subtractions

4. Use equation 417 to calculate $CS_3$ for the 3rd iteration:

$$CS_3 = CS_2 + x_a^3 - x_r^3 = CS_2 + x_a^2 \times x_a - x_r^2 \times x_r = 973 + 4 \times 2 - 9 \times 3 = 954$$

Operations in this step: 2 multiplications, 1 addition, 1 subtraction

5. Use equation 420 to calculate $QX_3$ for the 3rd iteration:

$$QX_3 = QX_2 + x_a^2\big((x_a - 2\bar{x}_3)^2 + 2\bar{x}_3^2\big) - x_r^2\big((x_r - 2\bar{x}_3)^2 + 2\bar{x}_3^2\big) - (\bar{x}_3 - \bar{x}_2)\Big(4CS_2 + 3(\bar{x}_3 + \bar{x}_2)\big(4(\bar{x}_3^2 + \bar{x}_2^2) - 2SS_2\big)\Big) = 535.828125 + 2^2((2 - 2 \times 4.5)^2 + 2 \times 4.5^2) - 3^2((3 - 2 \times 4.5)^2 + 2 \times 4.5^2) - (4.5 - 4.75)\big(4 \times 973 + 3(4.5 + 4.75)(4 \times (4.5^2 + 4.75^2) - 2 \times 127)\big) = 535.828125 + 358 - 688.5 - (-398.921875) = 604.25$$

Operations in this step: 14 multiplications, 6 additions, 6 subtractions

6. Use equation 421 to calculate the kurtosis $\gamma_3^{(2)}$ for the 3rd iteration:

$$\gamma_3^{(2)} = \frac{4QX_3}{SX_3^2} = \frac{4 \times 604.25}{41^2} = \frac{2417}{1681} = 1.4378346222486615$$

Operations in this step: 1 division, 2 multiplications.

There are a total of 2 divisions, 22 multiplications, 9 additions and 10 subtractions.

Fig. 5B Cont'd 2

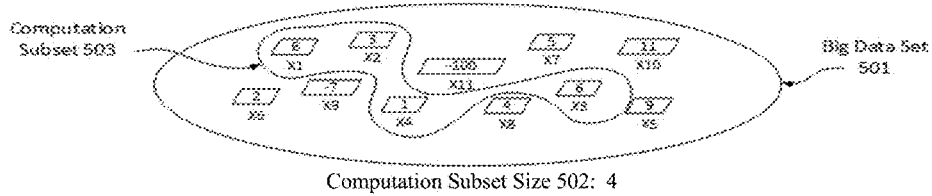

Computation Subset Size 502: 4

<u>Calculate Kurtosis for Computation Subset 503</u>

Iterative Algorithm 2:

1. Use equation 402 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 422 to calculate $SS_1$ and equation 425 to calculate $SX_1$ for the 1st iteration:

$$SS_1 = \sum_1^4 x_i^2 = 8^2 + 3^2 + 6^2 + 1^2 = 64 + 9 + 36 + 1 = 110$$

$$SX_1 = \sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 8 multiplications, 6 additions, 4 subtractions

3. Use equation 428 to calculate $CS_1$ and equation 431 to calculate $QS_1$ for the 1st iteration:

$$CS_1 = \sum_1^4 x_i^3 = 8^3 + 3^3 + 6^3 + 1^3 = 512 + 27 + 216 + 1 = 756$$

$$QS_1 = \sum_1^4 x_i^4 = 8^4 + 3^4 + 6^4 + 1^4 = 4096 + 81 + 1296 + 1 = 5474$$

Operations in this step: 12 multiplications, 6 additions

4. Use equation 434 to calculate $QX_1$ for the 1st iteration:

$$QX_1 = \sum_1^4 (x_i - \bar{x}_1)^4 = (8 - 4.5)^4 + (3 - 4.5)^4 + (6 - 4.5)^4 + (1 - 4.5)^4 = 150.0625 + 5.0625 + 5.0625 + 150.0625 = 310.25$$

Operations in this step: 8 multiplications, 3 additions, 4 subtractions

5. Use equation 437 to calculate the kurtosis $\gamma_1^{(2)}$ for the 1st iteration:

$$\gamma_1^{(2)} = \frac{4QX_1}{SX_1^2} = \frac{4 \times 310.25}{29^2} = \frac{1241}{841} = 1.4756242568370987$$

Operations in this step: 1 division, 2 multiplications

There are a total of 2 divisions, 30 multiplications, 18 additions and 8 subtractions.

Fig. 5C

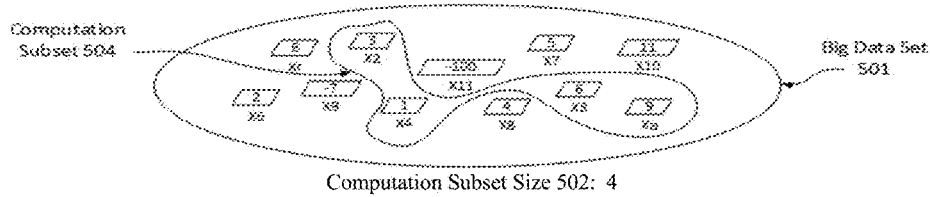

Computation Subset Size 502: 4

Calculate Kurtosis for Computation Subset 504

Iterative Algorithm 2:

1. Use equation 408 to calculate $\bar{x}_2$ for the 2nd iteration:

$$\bar{x}_2 = \bar{x}_1 + \frac{(x_a - x_r)}{4} = 4.5 + \frac{(9-8)}{4} = 4.75$$

Operations in this step: 1 division, 1 addition, 1 subtraction

2. Calculate $x_r^2$, $x_a^2$ and $\bar{x}_2^2$ for the 2nd iteration:

$$x_r^2 = 8 \times 8 = 64, \quad x_a^2 = 9 \times 9 = 81, \quad \bar{x}_2^2 = 4.75 \times 4.75 = 22.5625$$

Operations in this step: 3 multiplications

3. Use equation 424 to calculate $SS_2$ and equation 427 to calculate $SX_2$ for the 2nd iteration:

$$SS_2 = SS_1 + x_a^2 - x_r^2 = 110 + 81 - 64 = 127$$

$$SX_2 = SS_2 - 4\bar{x}_2^2 = 127 - 4 \times 4.75^2 = 127 - 90.25 = 36.75$$

Operations in this step: 1 multiplication, 1 addition, 2 subtractions

4. Use equation 430 to calculate $CS_2$ and equation 433 to calculate $QS_2$ for the 2nd iteration:

$$CS_2 = CS_1 + x_a^3 - x_r^3 = CS_1 + x_a^2 \times x_a - x_r^2 \times x_r = 756 + 9^2 \times 9 - 8^2 \times 8 = 973$$

$$QS_2 = QS_1 + x_a^4 - x_r^4 = QS_1 + x_a^2 \times x_a^2 - x_r^2 \times x_r^2 = 5474 + 81 \times 81 - 64 \times 64 = 7939$$

Operations in this step: 4 multiplications, 2 additions, 2 subtractions

5. Use equation 436 to iteratively calculate $QX_2$ for the 2nd iteration:

$$QX_2 = QS_2 + (3\bar{x}_2(2SS_2 - 4\bar{x}_2^2) - 4CS_2)\bar{x}_2 = 7939 + (3 \times 4.75 \times (2 \times 127 - 4 \times 22.5625) - 4 \times 973) \times 4.75 = 7939 + (14.25 \times (254 - 90.25) - 3892) \times 4.75 = 7939 + (14.25 \times 163.75 - 3892) \times 4.75 = 7939 + (2333.4375 - 3892) \times 4.75 = 7939 + (-1558.5625) \times 4.75 = 7939 + (-7403.171875) = 535.828125$$

Operations in this step: 6 multiplications, 1 addition, 2 subtractions

6. Use equation 437 to calculate the kurtosis $\gamma_2^{(2)}$ for the 2nd iteration:

$$\gamma_2^{(2)} = \frac{4QX_2}{SX_2^2} = \frac{4 \times 535.828125}{36.75^2} = \frac{2143.3125}{1350.5625} = 1.586977648202138$$

Operations in this step: 1 division, 2 multiplications.

There are a total of 2 divisions, 16 multiplications, 5 additions and 7 subtractions.

Fig. 5C Cont'd 1

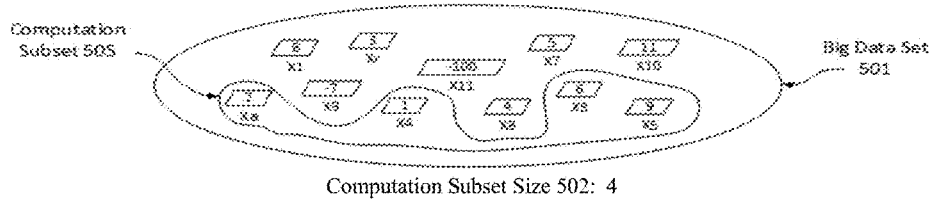

Computation Subset Size 502: 4

Calculate Kurtosis for Computation Subset 505

Iterative Algorithm 2:

1. Use equation 408 to calculate $\bar{x}_3$ for the 3$^{rd}$ iteration:

$\bar{x}_3 = \bar{x}_2 + \frac{(x_a - x_r)}{4} = 4.75 + \frac{(2-3)}{4} = 4.5$

Operations in this step: 1 division, 1 addition, 1 subtraction

2. Calculate $x_r^2$, $x_a^2$ and $\bar{x}_3^2$ for the 3$^{rd}$ iteration:

$x_r^2 = 3 \times 3 = 9$, $x_a^2 = 2 \times 2 = 4$, $\bar{x}_3^2 = 4.5 \times 4.5 = 20.25$ Operations in this step: 3 multiplications 3. Use equation 424 to calculate $SS_3$ and use equation 427 to calculate $SX_3$ for the 3$^{rd}$ iteration:

$SS_3 = SS_2 + x_a^2 - x_r^2 = 127 + 4 - 9 = 122$, $SX_3 = SS_3 - 4\bar{x}_3^2 = 122 - 4 \times 4.5^2 = 41$ Operations in this step: 1 multiplication, 1 addition, 2 subtractions 4. Use equation 430 to calculate $CS_3$ and equation 433 to calculate $QS_3$ for the 3$^{rd}$ iteration:

$CS_3 = CS_2 + x_a^3 - x_r^3 = CS_2 + x_a^2 \times x_a - x_r^2 \times x_r = 973 + 4 \times 2 - 9 \times 3 = 954$ $QS_3 = QS_2 + x_a^4 - x_r^4 = QS_2 + x_a^2 \times x_a^2 - x_r^2 \times x_r^2 = 7939 + 4 \times 4 - 9 \times 9 = 7874$ Operations in this step: 4 multiplications, 2 additions, 2 subtractions 5. Use equation 436 to calculate $QX_3$ for the 3$^{rd}$ iteration:

$QX_3 = QS_3 + (3\bar{x}_3(2SS_3 - 4\bar{x}_3^2) - 4CS_3)\bar{x}_3 = 7874 + (3 \times 4.5 \times (2 \times 122 - 4 \times 20.25) - 4 \times 954) \times 4.5 = 7874 + (13.5 \times (244 - 81) - 3816) \times 4.5 = 7874 + (13.5 \times 163 - 3816) \times 4.5 = 7874 + (2200.5 - 3816) \times 4.5 = 7874 + (-1615.5) \times 4.5 = 7874 + (-7269.75) = 604.25$ Operations in this step: 6 multiplications, 1 addition, 2 subtractions 6. Use equation 437 to calculate the kurtosis $\gamma_3^{(2)}$ for the 3$^{rd}$ iteration:

$\gamma_3^{(2)} = \frac{4QX_3}{SX_3^2} = \frac{4 \times 604.25}{41^2} = \frac{2417}{1681} = 1.4378346222486615$ Operations in this step: 1 division, 2 multiplications.

There are a total of 2 divisions, 16 multiplications, 5 additions and 7 subtractions.

Fig. 5C Cont'd 2

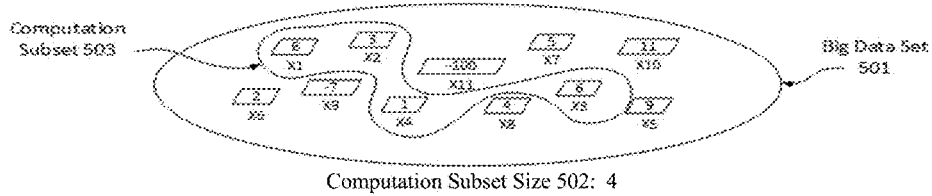

Computation Subset Size 502: 4

Calculate Kurtosis for Computation Subset 503

Iterative Algorithm 3:

1. Use equation 402 to calculate $\bar{x}_1$ for the 1st iteration:

$$\bar{x}_1 = \frac{8+3+6+1}{4} = \frac{18}{4} = 4.5$$

Operations in this step: 1 division, 3 additions

2. Use equation 438 to calculate $SS_1$ and equation 441 to calculate $SX_1$ for the 1st iteration:

$$SS_1 = \sum_1^4 x_i^2 = 8^2 + 3^2 + 6^2 + 1^2 = 64 + 9 + 36 + 1 = 110$$

$$SX_1 = \sum_1^4 (x_i - \bar{x}_1)^2 = (8 - 4.5)^2 + (3 - 4.5)^2 + (6 - 4.5)^2 + (1 - 4.5)^2 = 29$$

Operations in this step: 8 multiplications, 6 additions, 4 subtractions

3. Use equation 444 to calculate $CS_1$ and equation 447 to calculate $QS_1$ for the 1st iteration:

$$CS_1 = \sum_1^4 x_i^3 = 8^3 + 3^3 + 6^3 + 1^3 = 512 + 27 + 216 + 1 = 756$$

$$QS_1 = \sum_1^4 x_i^4 = 8^4 + 3^4 + 6^4 + 1^4 = 4096 + 81 + 1296 + 1 = 5474$$

Operations in this step: 12 multiplications, 6 additions

4. Use equation 450 to calculate $QX_1$ for the 1st iteration:

$$QX_1 = \sum_1^4 (x_i - \bar{x}_1)^4 = (8 - 4.5)^4 + (3 - 4.5)^4 + (6 - 4.5)^4 + (1 - 4.5)^4 = 150.0625 + 5.0625 + 5.0625 + 150.0625 = 310.25$$

Operations in this step: 8 multiplications, 3 additions, 4 subtractions

5. Use equation 453 to calculate the kurtosis $\gamma_1^{(2)}$ for the 1st iteration:

$$\gamma_1^{(2)} = \frac{4QX_1}{SX_1^2} = \frac{4 \times 310.25}{29^2} = \frac{1241}{841} = 1.4756242568370987$$

Operations in this step: 1 division, 2 multiplications

There are a total of 2 divisions, 30 multiplications, 18 additions and 8 subtractions.

Fig. 5D

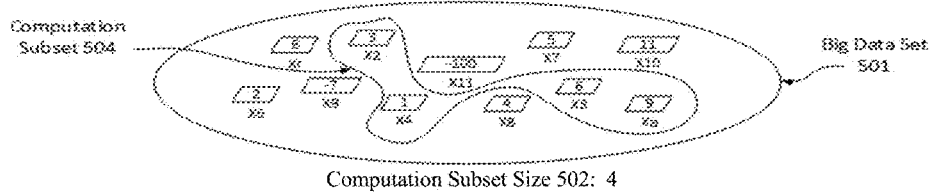

Computation Subset Size 502: 4

<u>Calculate Kurtosis for Computation Subset 504</u>

Iterative Algorithm 3:

1. Use equation 408 to calculate $\bar{x}_2$ for the 2$^{nd}$ iteration:

$$\bar{x}_2 = \bar{x}_1 + \frac{(x_a - x_r)}{4} = 4.5 + \frac{(9-8)}{4} = 4.75$$

Operations in this step: 1 division, 1 addition, 1 subtraction

2. Calculate $x_r^2$, $x_a^2$ and $\bar{x}_2^2$ for the 2$^{nd}$ iteration:

$$x_r^2 = 8 \times 8 = 64, \quad x_a^2 = 9 \times 9 = 81, \quad \bar{x}_2^2 = 4.75 \times 4.75 = 22.5625$$

Operations in this step: 3 multiplications

3. Use equation 440 to calculate $SS_2$ and equation 443 to calculate $SX_2$ for the 2$^{nd}$ iteration:

$$SS_2 = SS_1 + x_a^2 - x_r^2 = 110 + 9^2 - 8^2 = 127$$

$$SX_2 = SX_1 + (x_a - x_r)((x_r + x_a) - (\bar{x}_1 + \bar{x}_2)) = 29 + (9 - 8)((8 + 9) - (4.5 + 4.75)) = 36.75$$

Operations in this step: 1 multiplication, 4 additions, 3 subtractions

4. Use equation 446 to calculate $CS_2$ and equation 449 to calculate $QS_2$ for the 2$^{nd}$ iteration:

$$CS_2 = CS_1 + x_a^3 - x_r^3 = CS_1 + x_a^2 \times x_a - x_r^2 \times x_r = 756 + 81 \times 9 - 64 \times 8 = 973$$

$$QS_2 = QS_1 + x_a^4 - x_r^4 = QS_1 + x_a^2 \times x_a^2 - x_r^2 \times x_r^2 = 5474 + 81 \times 81 - 64 \times 64 = 7939$$

Operations in this step: 4 multiplications, 2 additions, 2 subtractions

5. Use equation 452 to calculate $QX_2$ for the 2$^{nd}$ iteration:

$$QX_2 = QS_2 + (3\bar{x}_2(2SS_2 - 4\bar{x}_2^2) - 4CS_2)\bar{x}_2 = 7939 + (3 \times 4.75 \times (2 \times 127 - 4 \times 22.5625) - 4 \times 973) \times 4.75 = 7939 + (14.25 \times (254 - 90.25) - 3892) \times 4.75 = 7939 + (14.25 \times 163.75 - 3892) \times 4.75 = 7939 + (2333.4375 - 3892) \times 4.75 = 7939 + (-1558.5625) \times 4.75 = 7939 + (-7403.171875) = 535.828125$$

Operations in this step: 6 multiplications, 1 addition, 2 subtractions

6. Use equation 453 to calculate the kurtosis $\gamma_2^{(2)}$ for the 2$^{nd}$ iteration:

$$\gamma_2^{(2)} = \frac{4QX_2}{SX_2^2} = \frac{4 \times 535.828125}{36.75^2} = \frac{2143.3125}{1350.5625} = 1.586977648202138$$

Operations in this step: 1 division, 2 multiplications.

There are a total of 2 divisions, 16 multiplications, 8 additions and 8 subtractions.

Fig. 5D Cont'd 1

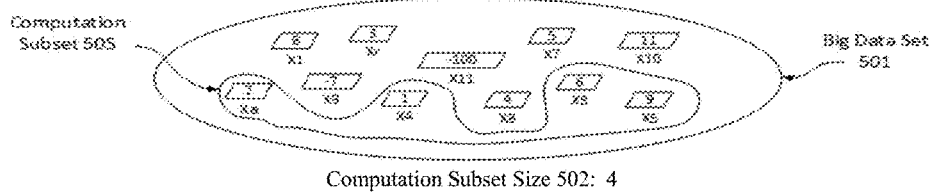

Computation Subset Size 502: 4

<u>Calculate Kurtosis for Computation Subset 505</u>

Iterative Algorithm 3:

1. Use equation 408 to calculate $\bar{x}_3$ for the 3rd iteration:

$$\bar{x}_3 = \bar{x}_2 + \frac{(x_a - x_r)}{4} = 4.75 + \frac{(2-3)}{4} = 4.5$$

Operations in this step: 1 division, 1 addition, 1 subtraction

2. Calculate $x_r^2$, $x_a^2$ and $\bar{x}_3^2$ for the 3rd iteration:

$$x_r^2 = 3 \times 3 = 9, \quad x_a^2 = 2 \times 2 = 4, \quad \bar{x}_3^2 = 4.5 \times 4.5 = 20.25$$

Operations in this step: 3 multiplications

3. Use equation 440 to calculate $SS_3$ and equation 443 to calculate $SX_3$ for the 3rd iteration:

$$SS_3 = SS_2 + x_a^2 - x_r^2 = 127 + 4 - 9 = 122$$

$$SX_3 = SX_2 + (x_a - x_r)\big((x_r + x_a) - (\bar{x}_2 + \bar{x}_3)\big) = 36.75 + (2-3)\big((3+2) - (4.75 + 4.5)\big) = 41$$

Operations in this step: 1 multiplication, 4 additions, 3 subtractions

4. Use equation 446 to calculate $CS_3$ and equation 449 to calculate $QS_3$ for the 3rd iteration:

$$CS_3 = CS_2 + x_a^3 - x_r^3 = CS_2 + x_a^2 \times x_a - x_r^2 \times x_r = 973 + 4 \times 2 - 9 \times 3 = 954$$

$$QS_3 = QS_2 + x_a^4 - x_r^4 = QS_2 + x_a^2 \times x_a^2 - x_r^2 \times x_r^2 = 7939 + 4 \times 4 - 9 \times 9 = 7874$$

Operations in this step: 4 multiplications, 2 additions, 2 subtractions

5. Use equation 452 to calculate $QX_3$ for the 3rd iteration:

$$QX_3 = QS_3 + \big(3\bar{x}_3(2SS_3 - 4\bar{x}_3^2) - 4CS_3\big)\bar{x}_3 = 7874 + (3 \times 4.5 \times (2 \times 122 - 4 \times 20.25) - 4 \times 954) \times 4.5 = 7874 + (13.5 \times (244 - 81) - 3816) \times 4.5 = 7874 + (13.5 \times 163 - 3816) \times 4.5 = 7874 + (2200.5 - 3816) \times 4.5 = 7874 + (-1615.5) \times 4.5 = 7874 + (-7269.75) = 604.25$$

Operations in this step: 6 multiplications, 1 addition, 2 subtractions

6. Use equation 453 to calculate the kurtosis $\gamma_3^{(2)}$ for the 3rd iteration:

$$\gamma_3^{(2)} = \frac{4QX_3}{SX_3^2} = \frac{4 \times 604.25}{41^2} = \frac{2417}{1681} = 1.4378346222486615$$

Operations in this step: 1 division, 2 multiplications

There are a total of 2 divisions, 16 multiplications, 8 additions and 8 subtractions.

Fig. 5D Cont'd 2

|  | Division | Multiplication | Addition | Subtraction |
|---|---|---|---|---|
| Traditional Algorithm | 2 | 14 | 9 | 8 |
| Iterative Algorithm 1 | 2 | 22 | 9 | 10 |
| Iterative Algorithm 2 | 2 | 16 | 5 | 7 |
| Iterative Algorithm 3 | 2 | 16 | 8 | 8 |

|  | Division | Multiplication | Addition | Subtraction |
|---|---|---|---|---|
| Traditional Algorithm | 2 | 3,000,002 | 2,999,997 | 2,000,000 |
| Iterative Algorithm 1 | 2 | 22 | 9 | 10 |
| Iterative Algorithm 2 | 2 | 16 | 5 | 7 |
| Iterative Algorithm 3 | 2 | 16 | 8 | 8 |

ITERATIVE KURTOSIS CALCULATION FOR BIG DATA USING COMPONENTS

CROSS-REFERENCE TO RELATED APPLICATIONS

This application claims the benefit of provisional patent application Ser. No. 62/089,233, filed 2014 Dec. 9 by the present inventor.

BACKGROUND AND RELEVANT ART

Internet, mobile communications, navigation, online gaming, sensing technologies and large scale computing infrastructures are producing large amounts of data every day. Big Data is data that is beyond the processing capacity of conventional database systems and analyzing capacity of traditional analyzing methods due to its large volume and fast moving and growing speed. More companies now rely on Big Data to make real-time decisions to solve various problems. Current methods involve utilizing a lot of computational resources, which are very costly, yet still may not satisfy the needs of real-time decision making based on the newest information, especially in the financial industry. How to efficiently, promptly and cost-effectively process and analyze Big Data presents a difficult challenge to data analysts and computer scientists.

Processing Big Data may include performing calculations on multiple data elements. When performing statistical calculations on Big Data elements, the number of data elements to be accessed could be quite large. For example, when calculating a kurtosis a (potentially large) number of data elements may need to be accessed.

The difference between processing live data stream and streamed Big Data is that when processing streamed Big Data, all historical data elements are accessible, and thus it may not need to create a separate buffer to store newly received data elements.

Further, some statistical calculations are recalculated after some data changes in a Big Data set. Thus, the (potentially large) number of data elements may be repeatedly accessed. For example, it may be that a kurtosis is calculated for a computation subset with a fixed size n that includes n data elements of a Big Data set stored in storage media. As such, every time two data elements are accessed or received, one of the accessed or received data elements is removed from of the computation subset and the other data element is added to the computation subset. The n data elements in the computation subset are then accessed to recalculate the kurtosis.

As such, each data change in the computation subset might only change a small portion of the computation subset. Using all data elements in the computation subset to recalculate the kurtosis involves redundant data access and computation, and thus is time consuming and is an inefficient use of resources.

Depending on necessity, the computation subset length n could be extremely large, so the data elements in a computation subset could be distributed over a cloud comprising hundreds of thousands of computing devices. Re-performing a kurtosis calculation on Big Data sets after some data changing in traditional ways results in slow response and significant waste of computing resources.

BRIEF SUMMARY

The present disclosure describes methods, systems, and computing system program products for iteratively calculating kurtosis for Big Data. A system comprising one or more computing devices includes one or more storage media that have stored a Big Data set. A computation subset size indicates a specified number $n(n>1)$ of data elements in a computation subset of the Big Data set. Iteratively calculating a kurtosis for a modified computation subset includes iteratively calculating one or more $(p(p\geq 1))$ components of a kurtosis for the modified computation subset based on one or more components of a kurtosis for a previous computation subset and then calculating the kurtosis as needed using one or more iteratively calculated components. Iteratively calculating kurtosis avoids visiting all data elements in the modified computation subset and performing redundant computations thereby increasing calculation efficiency, saving computing resources and reducing computing system's power consumption.

The computing system initializes one or more $(v(1\leq v\leq p))$ components of a kurtosis for a computation subset of a specified size $(n(n>1))$. The initialization of the one or more components comprises calculating the one or more components through their definitions based on the data elements in the computation subset or accessing or receiving pre-calculated one or more components from one or more computing-device-readable media.

The computing system accesses a data element to be removed from the computation subset and a data element to be added to the computation subset. The computing system modifies the computation subset by removing the to-be-removed data element from the computation subset and adding the to-be-added data element to the computation subset.

The computing system directly iteratively calculating $v(1\leq v\leq p)$ components for the modified computation subset. Directly iteratively calculating the v components of a kurtosis includes directly iteratively calculating each of the v components one by one. Directly iteratively calculating a component includes: accessing the component calculated for the previous computation subset; removing any contribution of the removed data element from the component mathematically; adding a contribution of the added data element to the component mathematically.

The computing system indirectly iteratively calculating $w=p-v$ components as needed: indirectly iteratively calculating the w components includes indirectly iteratively calculating each of the w components one by one. Indirectly iteratively calculating a component includes calculating the component using one or more components other than the component itself. The one or more components may have been initialized, directly iteratively calculated or indirectly iteratively calculated.

The computing system generates a kurtosis as needed by using one or more iteratively calculated components of a kurtosis.

The computing system may keep accessing a data element to be removed and a data element to be added, modifying the computation subset, directly iteratively calculating $v(1\leq v\leq p)$ components, indirectly iteratively calculating $w=p-v$ components and generating a kurtosis based on the one or more iteratively calculated components as needed, and the computing system may repeat this process for as many times as needed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates the definition of a kurtosis and traditional equations for calculating a kurtosis.

FIG. 4B illustrates some example components of a kurtosis and basic iterative component calculation equations.

FIG. 4C illustrates the equations of the first example iterative kurtosis calculation algorithm (iterative algorithm 1).

FIG. 4D illustrates the equations of the second example iterative kurtosis calculation algorithm (iterative algorithm 2).

FIG. 4E illustrates the equations of the third example iterative kurtosis calculation algorithm (iterative algorithm 3).

FIG. 5A illustrates an example of calculating kurtosis using traditional algorithms as shown in FIG. 4A.

FIG. 5B illustrates an example of calculating kurtosis using iterative algorithm 1 as shown in FIG. 4C.

FIG. 5C illustrates an example of calculating kurtosis using iterative algorithm 2 as shown in FIG. 4D.

FIG. 5D illustrates an example of calculating kurtosis using iterative algorithm 3 as shown in FIG. 4E.

FIG. 6 illustrates computational loads for traditional kurtosis algorithms and iterative kurtosis algorithms with a computation subset of size 4.

FIG. 7 illustrates computational loads for traditional kurtosis algorithms and iterative kurtosis algorithms with a computation subset of size 1,000,000.

DETAILED DESCRIPTION

Figure 1:
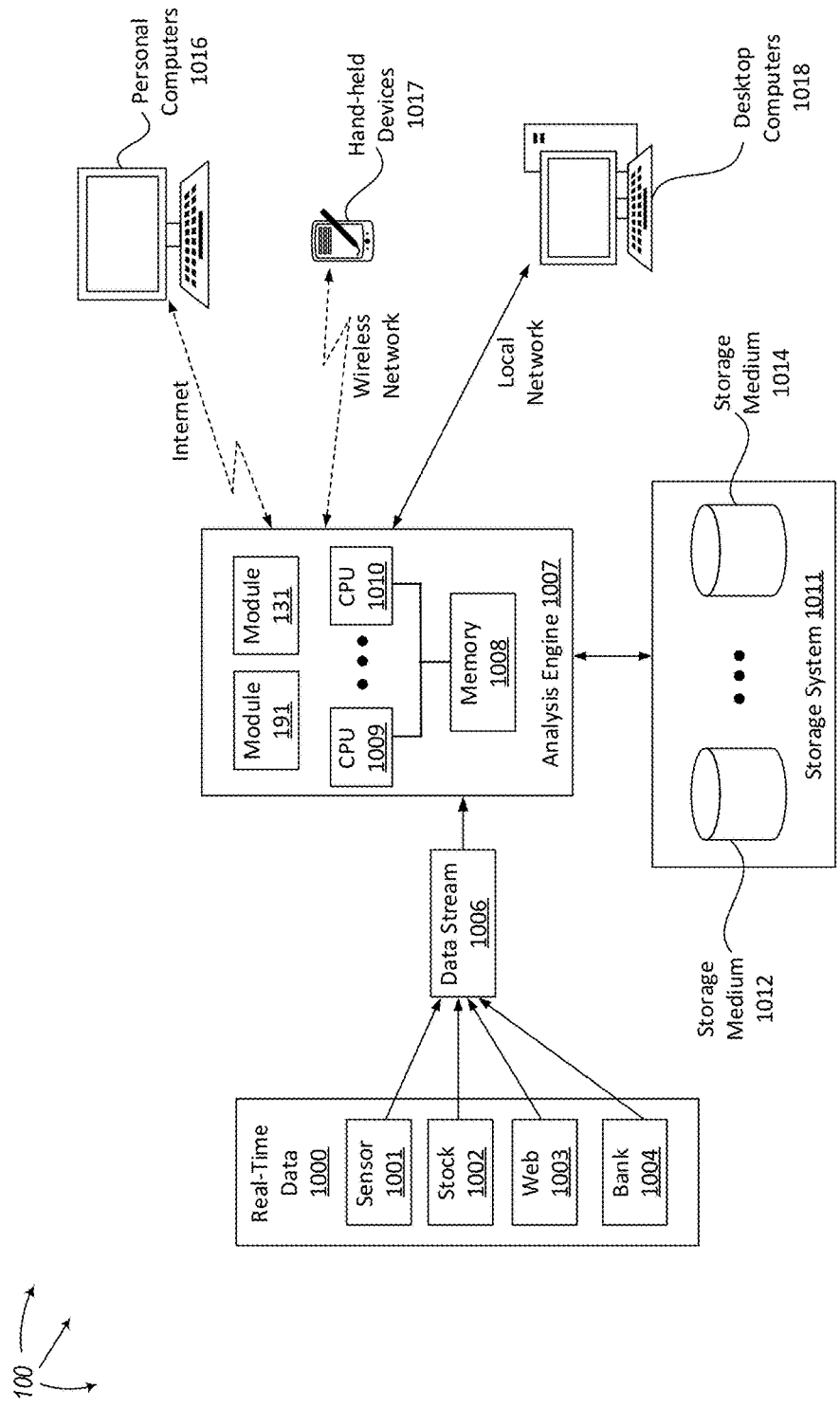
FIG. 1 illustrates a high-level overview of an example computing system that facilitates iteratively calculating kurtosis for Big Data.

The present disclosure describes methods, systems, and computing system program products for iteratively calculating a kurtosis for Big Data. A system comprising one or more computing devices includes one or more storage media that have stored a Big Data set. A computation subset size indicates a specified number $n(n>1)$ of data elements in a computation subset of the Big Data set. Iteratively calculating a kurtosis for a modified computation subset includes iteratively calculating one or more ($p(p \geq 1)$) components of the kurtosis for the modified computation subset based on one or more components of a kurtosis for a previous computation subset and then calculating the kurtosis as needed using one or more iteratively calculated components. Iteratively calculating the kurtosis avoids visiting all data elements in the modified computation subset and performing redundant computations thereby increasing calculation efficiency, saving computing resources and reducing computing system's power consumption.

A kurtosis is the normalized fourth central moment of the values of a random variable, which describes how fast the density function approaches zero in the left and right tail. A negative kurtosis indicates that the variance is mostly caused by many values far away from the mean of the values. A positive kurtosis indicates that the variance is mainly affected by few extreme deviations from the mean of the values.

A computation subset is a subset of a Big Data set which comprises the data elements involved in a kurtosis calculation. A computation subset is equivalent to a moving computation window when performing a kurtosis calculation on streamed data or time series data. Within the description of embodiments of the present invention, the difference between a computation window and a computation subset is that data elements in a computation window are ordered but that in a computation subset are not.

A component of a kurtosis is a quantity or expression appearing in the kurtosis's definition equation or any transforms of the equation. A kurtosis is the largest component of a kurtosis itself. A kurtosis may be calculated by using one or more components of the kurtosis. Some example components of a kurtosis may be found in FIG. 4B.

A component may be either directly iteratively calculated or indirectly iteratively calculated. The difference between them is that when directly iteratively calculating a component, the component is calculated by using the component's value in previous iteration but when indirectly iteratively calculating a component, the component is calculated by using components other than the component itself.

For a given component, it might be directly iteratively calculated in one algorithm but indirectly iteratively calculated in another algorithm.

For a given algorithm, assume the total number of different components is $p(p \geq 1)$, the number of directly iteratively calculated components is $v(1 \leq v \leq p)$, then the number of indirectly iteratively calculated components is $w=p-v$ ($0 \leq w < p$). For any algorithm, there will be at least one component being directly iteratively calculated. It is possible that all components are directly iteratively calculated (in this case $v=p$ and $w=0$). However, directly iteratively calculated components must be calculated in every iteration no matter if a kurtosis is accessed or not in a specific iteration.

For a given algorithm, if a component is directly iteratively calculated, then the component must be calculated in every iteration (i.e., whenever an existing data element is removed from and a data element is added to the computation subset). However, if a component is indirectly iteratively calculated, then the component may be calculated as needed, i.e., when a kurtosis needs to be calculated and accessed. Thus, when a kurtosis is not accessed in a specific iteration, only a small number of components are iteratively calculated to save computation time. It should be understood that an indirectly iteratively calculated component may also be used in the calculation of a directly iteratively calculated component. In that case, the indirectly iteratively calculated component should also be calculated in every iteration.

Embodiments of the invention include iteratively calculating one or more ($p(p \geq 1)$) components of a kurtosis in a modified computation subset based on one or more ($p(p \geq 1)$) components calculated for a previous computation subset.

The computing system initializes one or more ($v(1 \leq v \leq p)$) components of a kurtosis for a computation subset of a specified size $n(n>1)$. The initialization of the one or more components comprises calculating the one or more components through their definitions by using the data elements in the computation subset or accessing or receiving pre-calculated one or more components from one or more computing-device-readable media.

The computing system accesses a data element to be removed from the computation subset and a data element to be added to the computation subset. The computing system modifies the computation subset by: removing the to-be-removed data element from the computation subset and adding the to-be-added data element to the computation subset.

The computing system directly iteratively calculating $v(1 \leq v \leq p)$ components for the modified computation subset. Directly iteratively calculating the v components of a kurtosis includes directly iteratively calculating each of the v components one by one. Directly iteratively calculating a component includes: accessing the component calculated for the previous computation subset; removing any contribution of the removed data element from the component mathematically; adding a contribution of the added data element to the component mathematically.

The computing system indirectly iteratively calculating $w=p-v$ components as needed: indirectly iteratively calculating the w components includes indirectly iteratively calculating each of the w components one by one. Indirectly iteratively calculating a component includes calculating the component using one or more components other than the component itself (Depending on a specific algorithm used, calculating each of the w components may also need access to and use of the removed data element and/or the added data element). The one or more components may have been initialized, directly iteratively calculated or indirectly iteratively calculated.

The computing system generates a kurtosis as needed by using one or more initialized or iteratively calculated components of a kurtosis.

The computing system may keep accessing an existing data element to be removed from the computation subset and a data element from the data set to be added to the computation subset, modifying the computation subset, directly iteratively calculating $v(1 \leq v \leq p)$ components, indirectly iteratively calculating $w=p-v$ components as needed and generating a kurtosis as needed using one or more components, and the computing system may repeat this process for as many times as needed.

Embodiments of the present invention may comprise or utilize a special purpose or general-purpose computing device including computing device hardware, such as, for example, one or more processors and system memory, as discussed in greater detail below. Embodiments within the scope of the present invention also include physical and other computing-device-readable media for carrying or storing computing-device-executable instructions and/or data structures. Such computing-device-readable media may be any available media that may be accessed by a general purpose or special purpose computing device. Computing-device-readable media that store computing-device-executable instructions are computing device storage media (devices). Computing-device-readable media that carry computing-device-executable instructions are transmission media. Thus, by way of example, and not limitation, embodiments of the invention may comprise at least two distinctly different kinds of computing-device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing-device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media may include a network and/or data links which may be used to carry desired program code means in the form of computing-device-executable instructions or data structures and which may be accessed by a general purpose or special purpose computing device. Combinations of the above should also be included within the scope of computing-device-readable media.

Further, upon reaching various computing device components, program code means in the form of computing-device-executable instructions or data structures may be transferred automatically from transmission media to computing device storage media (devices) (or vice versa). For example, computing-device-executable instructions or data structures received over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing-device-executable instructions comprise, for example, instructions and data which, when executed at a processor, cause a general purpose computing device or special purpose computing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention may also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model may also expose various service models, such as, for example, Software as a Service ("SaaS"), Platform as a Service ("PaaS"), and Infrastructure as a Service ("IaaS"). A cloud computing model may also be deployed using different deployment models such as private cloud, community cloud, public cloud, hybrid cloud, and so forth. In this description and in the claims, a "cloud computing environment" is an environment in which cloud computing is employed.

Several examples will be given in the following sections.

FIG. 1 illustrates a high-level overview of an example computing system 100 that facilitates iteratively calculating kurtosis for Big Data. Referring to FIG. 1, computing system 100 comprises multiple devices connected by different networks, such as local network, internet and wireless network, etc. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, kurtosis calculation module 191 and component calculation modules 131. Kurtosis calculation module 191 and component calculation modules 131 will be illustrated in more details in other figures. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may receive data elements from data stream 1006. It should be understood that FIG. 100 is provided to introduce a selection of concepts in a much simplified form, for example, distributed devices 1016 and 1017 may need to go through a firewall to connect data analysis engine 1007, and data accessed or received from data stream 1006 and/or storage system 1011 by data analysis engine 1007 may be filtered by data filters, etc.

Figure 1A:
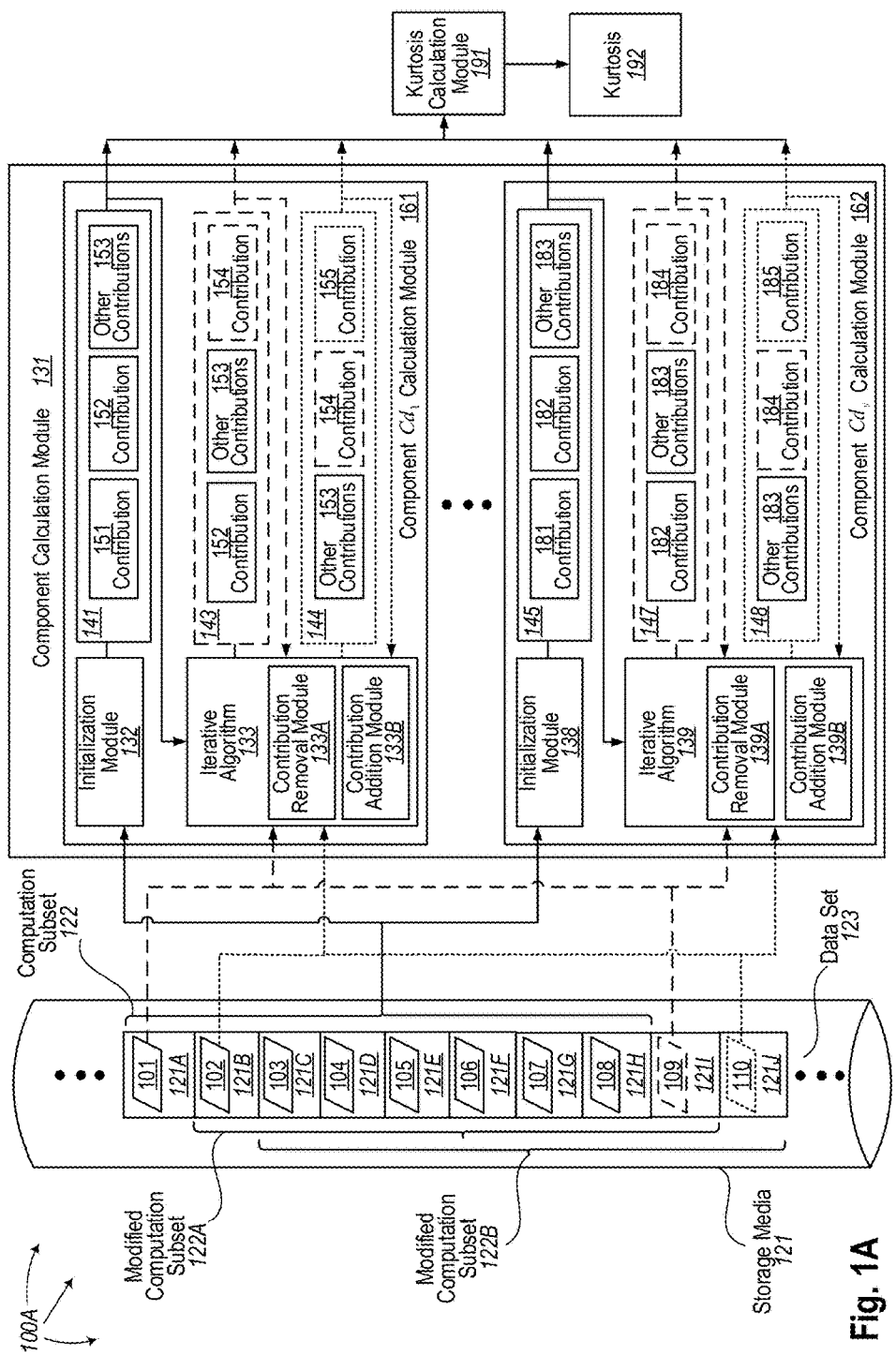
FIG. 1A illustrates an example computing system architecture that facilitates iteratively calculating kurtosis for Big Data with all components being directly iteratively calculated.

FIG. 1A illustrates an example computing system architecture 100A that facilitates iteratively calculating kurtosis for Big Data with all components ($p(p=v≥1)$) being directly iteratively calculated. FIG. 1A illustrates 1007 and 1006 shown in FIG. 1. Referring to FIG. 1A, computing system architecture 100A includes component calculation module 131. Component calculation module 131 may be tightly coupled with one or more storage media by a high-speed data bus or loosely coupled with one or more storage media managed by a storage system via (or is part of) a network, such as, for example, a Local Area Network ("LAN"), a Wide Area Network ("WAN"), and even the Internet. Accordingly, component calculation module 131 as well as any other connected computing devices and their components, may send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network. The output of component calculation module 131 will be used as the input of kurtosis calculation module 191, and kurtosis calculation module 191 will generate kurtosis 192.

In general, storage media 121 may be a single local storage medium and may also be a complex storage system that comprises multiple physically distributed storage devices managed by a storage management system.

Storage media 121 comprises a data set 123. In general, data set 123 may comprise different kinds of data, such as, for example, stock quotes, audio data, video data, geospatial data, web data, mobile communication data, online gaming data, banking transaction data, sensor data, and closed-captioning data, real time text, etc.

As depicted, data set 123 comprises multiple data elements stored in multiple locations of storage media 121. For example, data elements 101 is stored in location 121A, data element 102 is stored in location 121B, data element 103 is stored in location 121C, data element 104 is stored in location 121D, data element 105 is stored in location 121E, data element 106 is stored in location 121F, data element 107 is stored in location 121G, data element 108 is stored in location 121H, data element 109 is stored in location 121I, and data element 110 is stored in location 121J, etc., There are multiple data elements stored in other locations of storage media 121.

Assume that a kurtosis calculation is started from computation subset 122. Computation subset 122 with a specified size of 8 (i.e., n=8) contains a portion of data set 123: data elements 101, 102, . . . , and 108. All the data elements ranging from 101 to 108 in computation subset 122 may be accessed for initializing one or more components of the kurtosis.

Next, data elements 101 and 109 may be accessed from locations 121A and 121I respectively. Data element 101 will be removed from computation subset 122, and data element 109 will be added to computation subset 122, then computation subset 122 becomes modified computation subset 122A. Modified computation subset 122A contains 8 data elements: 102, 103, . . . , 109. The computing system may iteratively calculate a kurtosis for modified computation subset 122A.

Subsequently, data elements 102 and 110 may be accessed from locations 121B and 121J respectively. Data element 102 will be removed from modified computation subset 122A, and data element 110 will be added to modified computation subset 122A, then modified computation subset 122A becomes modified computation subset 122B. Modified computation subset 122B contains 8 data elements: 103, 103, . . . , 110. The computing system may iteratively calculate a kurtosis for modified computation subset 122B.

More details about the example computing system architecture are provided below.

Referring to computing system architecture 100A, component calculation module 131 comprises v (v=p≥1) component calculation modules for calculating v components for a set of n data elements in a computation subset. The number v varies depending on which iterative algorithm is used. As depicted in FIG. 1A, component calculation module 131 comprises component $Cd_1$ calculation module 161 and component $Cd_v$ calculation module 162, and there are v−2 other component calculation modules between them. Component $Cd_1$ calculation module 161 comprises initialization module 132 for initializing component $Cd_1$ and iterative algorithm 133 for directly iteratively calculating component $Cd_1$. Calculation module 162 comprises initialization module 138 for initializing component $Cd_v$ and iterative algorithm 139 for directly iteratively calculating component $Cd_v$. Initialization module 132 is configured to initialize component $Cd_1$ for a set of n data elements in a computation subset and initialization module 138 is configured to initialize component $Cd_v$ for a set of n data elements in a computation subset. Initialization module 132 and initialization module 138 access or receive a full set of n data elements (e.g., 8) from a computation subset as input. Initialization module 132 calculates component $Cd_1$ and initialization module 138 calculates component $Cd_v$ from the full set of n data elements. Thus, each data element contributes to the calculated components from component $Cd_1$ to component $Cd_v$. Initialization module 132 may be used for an initial component $Cd_1$ calculation or when kurtosis calculations are reset. Similarly, initialization module 138 may be used for an initial component $Cd_v$ calculation or when kurtosis calculations are reset.

Iterative algorithms are also configured to calculate v components for a set of n data elements in a computation subset. Iterative algorithm 133 accesses or receives a prior component $Cd_1$ value, an existing data element removed from the computation subset and a data element added to a computation subset as input. Iterative algorithm 133 directly iteratively calculates a new component $Cd_1$ from the prior component $Cd_1$ value, the data element removed from the computation subset and the data element added to the computation subset. Contribution removal module 133A may remove any contribution for the data element removed from the computation subset from the prior component $Cd_1$. Contribution addition module 133B may add a contribution for the data element added to the computation subset to the prior component $Cd_1$. Removing any contribution of the data element removed from the computation subset along with adding a contribution of the data element added to the computation subset may be used for directly iteratively calculating component $Cd_1$ for the modified computation subset. Iterative algorithm 139 works in a similar way as iterative algorithm 133. Iterative algorithm 139 accesses or receives a prior component $Cd_v$ value, the data element removed from the computation subset and a data element added to the computation subset as input. Iterative algorithm 139 directly iteratively calculates a new component $Cd_v$ from the prior component $Cd_v$ value the data element removed from the computation subset and the data element added to the computation subset. Contribution removal module 139A may remove any contribution of the data element removed from the computation subset from the prior component $Cd_v$. Contribution addition module 139B may add a contribution of the data element added to the computation subset to the prior component $Cd_v$. Removing a contribution for the data element removed from the computation subset along with adding a contribution for the data element added to the computation subset may be used for directly iteratively calculating component $Cd_v$ for the modified computation subset.

Referring to FIG. 1A, computing system architecture 100A also includes kurtosis calculation module 191. Once p (p=v≥1) components of a kurtosis are calculated by component calculation module 131, kurtosis calculation module 191 may calculate the kurtosis 192 as needed by using one or more initialized or iteratively calculated components.

Figure 1B:
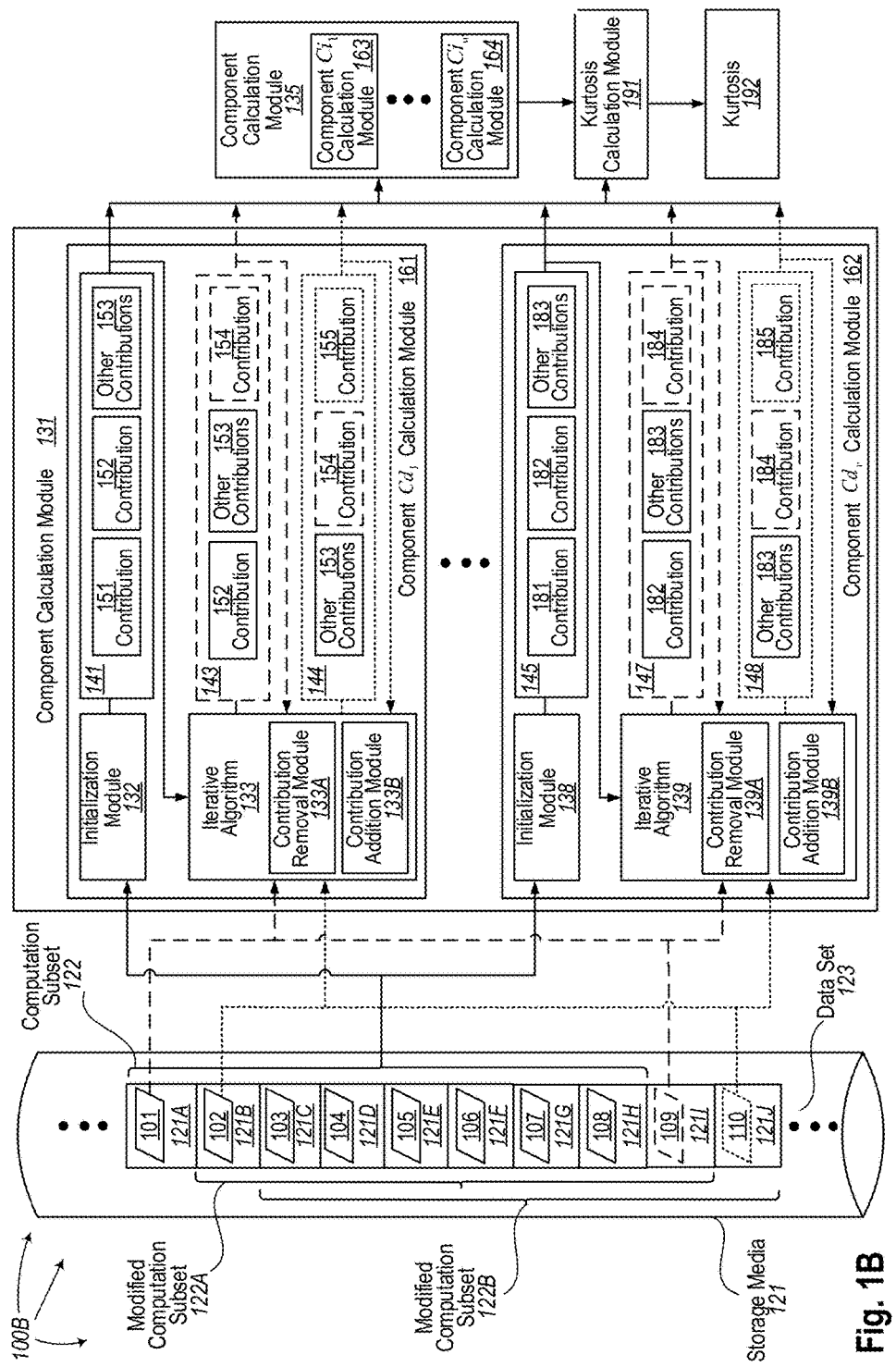
FIG. 1B illustrates an example computing system architecture that facilitates iteratively calculating kurtosis for Big Data with some components being directly iteratively calculated and some components are indirectly iteratively calculated.

FIG. 1B illustrates an example computing system architecture 100B that facilitates iteratively calculating kurtosis for Big Data with some (v(1≤v≤p)) components being directly iteratively calculated and some (w=p−v) components being indirectly iteratively calculated. Both the number v and the number w are algorithm dependent. Many parts included in computing system architectures 100B and 100A have same reference numbers. Those parts have similar structures and work in similar ways. In certain implementations, the difference between computing system architectures 100B and 100A may be that architecture 100B includes a component calculation module 135. All parts except component calculation module 135 in 100B work in a similar way as those parts with the same reference numbers in 100A. Instead of repeating what have already been explained in the description about 100A, only the different part is discussed here. Computing system architecture 100B also includes component calculation module 131, which also includes v component calculation modules for directly iteratively calculating v components, however the number v in 100B may not be the same number v as in 100A, because some directly iteratively calculated components in 100A are indirectly iteratively calculated in 100B. In 100A, v=p≥1, but in 100B, 1≤v<p. Referring to FIG. 1B, computing system architecture 100B includes component calculation module 135. The output of components calculation module 131 may be used as the input of component calculation module 135, and the output of calculation modules 131 and 135 may be used as the input of kurtosis calculation module 191, and kurtosis calculation module 191 may generate kurtosis 192. Component calculation module 135 generally includes w=p−v component calculation modules for indirectly iteratively calculating w components. For example, component calculation module 135 includes calculation module 163 for indirectly iteratively calculating component $Ci_1$ and calculation module 164 for indirectly iteratively calculating component $Ci_w$, and there are w−2 component calculation modules in between. Indirectly iteratively calculating w components includes indirectly iteratively calculating each of the w components one by one. Indirectly iteratively calculating a component includes accessing and using one or more components other than the component itself. The one or more components could be initialized, directly iteratively calculated or indirectly iteratively calculated. To save computation time, components ranging from $Ci_1$ to $Ci_w$ may be calculated as needed, i.e., they may not need to be calculated in every iteration. In other words, they only need to be calculated when a kurtosis is accessed. However, directly iteratively calculated components ranging from $Cd_1$ to $Cd_v$ must be calculated in every iteration even if kurtosis is not accessed in every iteration.

Referring to computing system architecture 100B, once all p (p=v+w) components have been calculated, kurtosis calculation module 191 may be used for calculating a kurtosis 192 as needed by using one or more initialized or iteratively calculated components.

Figure 2:
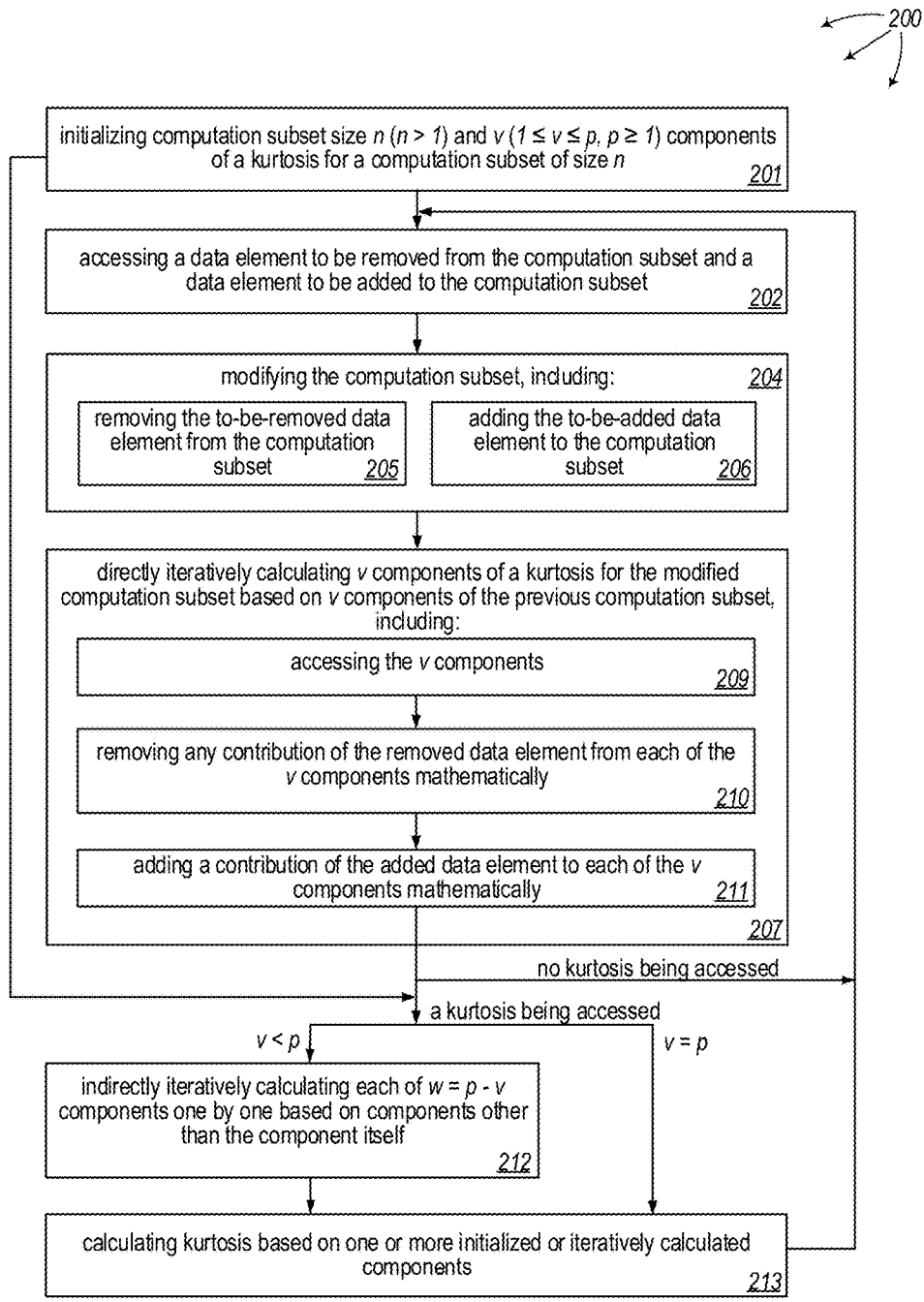
FIG. 2 illustrates a flow chart of an example method for iteratively calculating a kurtosis for Big Data.

FIG. 2 illustrates a flow chart of an example method 200 for iteratively calculating kurtosis for Big Data. Method 200 will be described with respect to the components and data of computing system architecture 100A and computing system architecture 100B.

Method 200 includes initializing v(1≤v≤p, p≥1) components of a kurtosis for a computation subset of a specified size n(n>1) (201). For example, in computing system architecture 100A and computing system architecture 100B, computation subset size is initialized to be 8, and initialization module 132 may be used for initializing component $Cd_1$ 141 for computation subset 122 of size 8 which contains data elements 101, 102, 103, 104, 105, 106, 107 and 108. As depicted, component $Cd_1$ 141 includes contribution 151, contribution 152, and other contributions 153. Contribution 151 is a contribution of data element 101. Contribution 152 is a contribution of data element 102. Other contributions 153 are contributions of data elements 103, 104, 105, 106, 107 and 108. Similarly, initialization module 138 may be used for initializing component $Cd_v$ 145 for computation subset 122 of size 8 which contains data elements 101, 102, 103, 104, 105, 106, 107 and 108. As depicted, component $Cd_v$ 145 includes contribution 181, contribution 182, and other contributions 183. Contribution 181 is a contribution of data element 101. Contribution 182 is a contribution of data element 102. Other contributions 183 are contributions of data elements 103, 104, 105, 106, 107 and 108.

Method 200 includes accessing a data element to be removed from the computation subset and a data element to be added to the computation subset (202). For example, data element 101 and data element 109 may be accessed subsequent to accessing data elements 102-108, and data element 101 may be removed from and data element 109 may be added to modified computation subset 122A.

Method 200 includes modifying the computation subset (204). For example, computation subset 122 may be modified to computation subset 122A. Modifying the computation subset includes removing the to-be-removed data element from the computation subset (205) and adding the to-be-added data element to the computation subset (206). For example, data element 101 is removed from and data element 109 is added to computation subset 122 which then becomes modified computation subset 122A.

Method 200 includes directly iteratively calculating v(1≤v≤p) components of a kurtosis for the modified computation subset based on v components for the previous computation subset (207). For example, iterative algorithm 133 may be used for directly iteratively calculating component $Cd_1$ 143 (for modified computation subset 122A) based on component $Cd_1$ 141 (for computation subset 122), and iterative algorithm 139 may be used for directly iteratively calculating component $Cd_v$ 147 (for modified computation subset 122A) based on component $Cd_1$ 145 (for computation subset 122).

Iteratively calculating v components of a kurtosis for the modified computation subset includes accessing the v components of the kurtosis in the previous computation subset (209). For example, iterative algorithm 133 may access component $Cd_1$ 141. Similarly, iterative algorithm 139 may access component $Cd_v$ 145.

Directly iteratively calculating v components of a kurtosis includes removing any contribution of the removed data element from the v components mathematically (210). For example, directly iteratively calculating component $Cd_1$ 143 may include contribution removal module 133A removing contribution 151 (i.e., the contribution of data element 101) from component $Cd_1$ 141 mathematically, and directly iteratively calculating component $Cd_v$ 147 may include contribution removal module 139A removing contribution 181 (i.e., the contribution of data element 101) from component $Cd_v$ 145 mathematically. Directly iteratively calculating v components of a kurtosis includes adding a contribution of the added data element added to the computation subset to the v components mathematically (211). For example, directly iteratively calculating component $Cd_1$ 143 may include contribution addition module 133B adding contribution 154 to component 141 mathematically, and directly iteratively calculating component $Cd_v$ 147 may include contribution addition module 139B adding contribution 184 to component $Cd_v$ 145 mathematically. Contribution 154 and 184 are contributions of data element 109.

As depicted in FIG. 1A, component $Cd_1$ 143 includes contribution 152 (a contribution of data element 102), other contributions 153 (contributions of data elements 103-108), and contribution 154 (a contribution of data element 109). Similarly, component $Cd_v$ 147 includes contribution 182 (a contribution of data element 102), other contributions 183 (contributions of data elements 103-108), and contribution 184 (a contribution of data element 109).

Besides directly iteratively calculated components, some components may be indirectly iteratively calculated. Method 200 includes indirectly iteratively calculating each of w=p−v components one by one as needed by using one or more components other than the component itself (212) when v<p, i.e., not all components are directly iteratively calculated. For example, referring to FIG. 1B where some components are directly iteratively calculated and some are indirectly iteratively calculated, calculation module 163 may indirectly iteratively calculate $Ci_1$ by using one or more components other than $Ci_1$, and calculation module 164 may indirectly iteratively calculate one or more components other than $Ci_w$. The one or more components could be initialized, directly iteratively calculated, or indirectly iteratively calculated. For a given component, it is possible that it is directly iteratively calculated in one algorithm but indirectly iteratively calculated in another algorithm. For example, referring to FIG. 4C, in Example Iterative Kurtosis Calculation Algorithm 1, component $QX_{k+1}$ for the k+1$^{th}$ iteration is directly iteratively calculated based on component $QX_k$ for the k$^{th}$ iteration and other components and the data element removed from the computation subset. However, referring to FIG. 4E, in Example Iterative Kurtosis Calculation Algorithm 3, component $QX_{k+1}$ for the k+1$^{th}$ iteration is indirectly iteratively calculated based on components other than QX. For a given algorithm, directly iteratively calculated components must be calculated whenever there is a change in the computation subset (e.g., an existing data element is removed from and a data element is added to the computation subset), no matter if a kurtosis is accessed or not; however, an indirectly iteratively component only needs to be calculated as needed, i.e., when a kurtosis is accessed. For example, referring to FIG. 4E, in Example Iterative Kurtosis Calculation Algorithm 3, component $QX_{k+1}$ only needs to be calculated when a kurtosis $\gamma_{k+1}^{(2)}$ is accessed.

Method 200 includes calculating a kurtosis using one or more iteratively calculated components of the kurtosis (213). The one or more components may be initialized, may all be directly iteratively calculated (v=p) or partially be directly iteratively calculated and partially be indirectly derementally calculated (v<p) (207).

202-211 may be repeated as additional data elements are accessed. 212-213 may be repeated as needed. For example, subsequent to calculating component $Cd_1$ 143 and component $Cd_v$ 147, data element 102 and data element 110 may be accessed (202). Data elements 102 and 110 may be accessed from locations 121B and 121J respectively. Modified computation subset 122A may become modified computation subset 122B (204) by removing data element 102 (205) and adding data element 110 (206).

Iterative algorithm 133 may be used for directly iteratively calculating component $Cd_1$ 144 (for modified computation subset 122B) based on component $Cd_1$ 143 (for modified computation subset 122A) (207). Iterative algorithm 133 may access component $Cd_1$ 143 (209). Iteratively calculating component $Cd_1$ 144 may include contribution removal module 133A removing contribution 152 (i.e., the contribution of data element 102) from component $Cd_1$ 143 mathematically (210). Iteratively calculating component $Cd_1$ 144 may include contribution addition module 133B adding contribution 155 to component $Cd_1$ 143 mathematically (211). Contribution 155 is a contribution of data element 110.

Similarly, iterative algorithm 139 may be used for directly iteratively calculating component $Cd_v$ 148 (for modified computation subset 122B) based on component $Cd_v$ 147 (for modified computation subset 122A) (207). Iterative algorithm 139 may access component $Cd_v$ 147 (209). Iteratively calculating component $Cd_v$ 148 may include contribution removal module 139A removing contribution 182 (i.e., the contribution of data element 102) from component $Cd_v$ 147 mathematically (210). Iteratively calculating component $Cd_v$ 148 may include contribution addition module 139B adding contribution 185 to component $Cd_v$ 147 mathematically (211). Contribution 185 is a contribution of data element 110.

As depicted, component $Cd_1$ 144 includes other contributions 153 (contributions for data elements 103-108), contribution 154 (a contribution of data element 109), and contribution 155 (a contribution of data element 110), and component $Cd_v$ 148 includes other contributions 183 (contributions of data elements 103-108), contribution 184 (a contribution of data element 109), and contribution 185 (a contribution of data element 110).

Some components may be directly iteratively calculated (209, 210 and 211) and some components may be indirectly iteratively calculated (212). For example, Referring to FIG. 1B, calculation module 163 may indirectly iteratively calculate $Ci_1$ based on component $Cd_1$ and two other directly iteratively calculated components, and calculation module 164 may indirectly iteratively calculate $Ci_v$ based on directly iteratively calculated component $Cd_v$, indirectly iteratively calculated component $Ci_1$ and the input data element.

When a next data element is accessed, component $Cd_1$ 144 may be used for directly iteratively calculating a component $Cd_1$ for the modified computation subset and component $Cd_v$ 148 may be used for directly iteratively calculating a component $Cd_v$ for the modified computation subset.

Figure 3B:
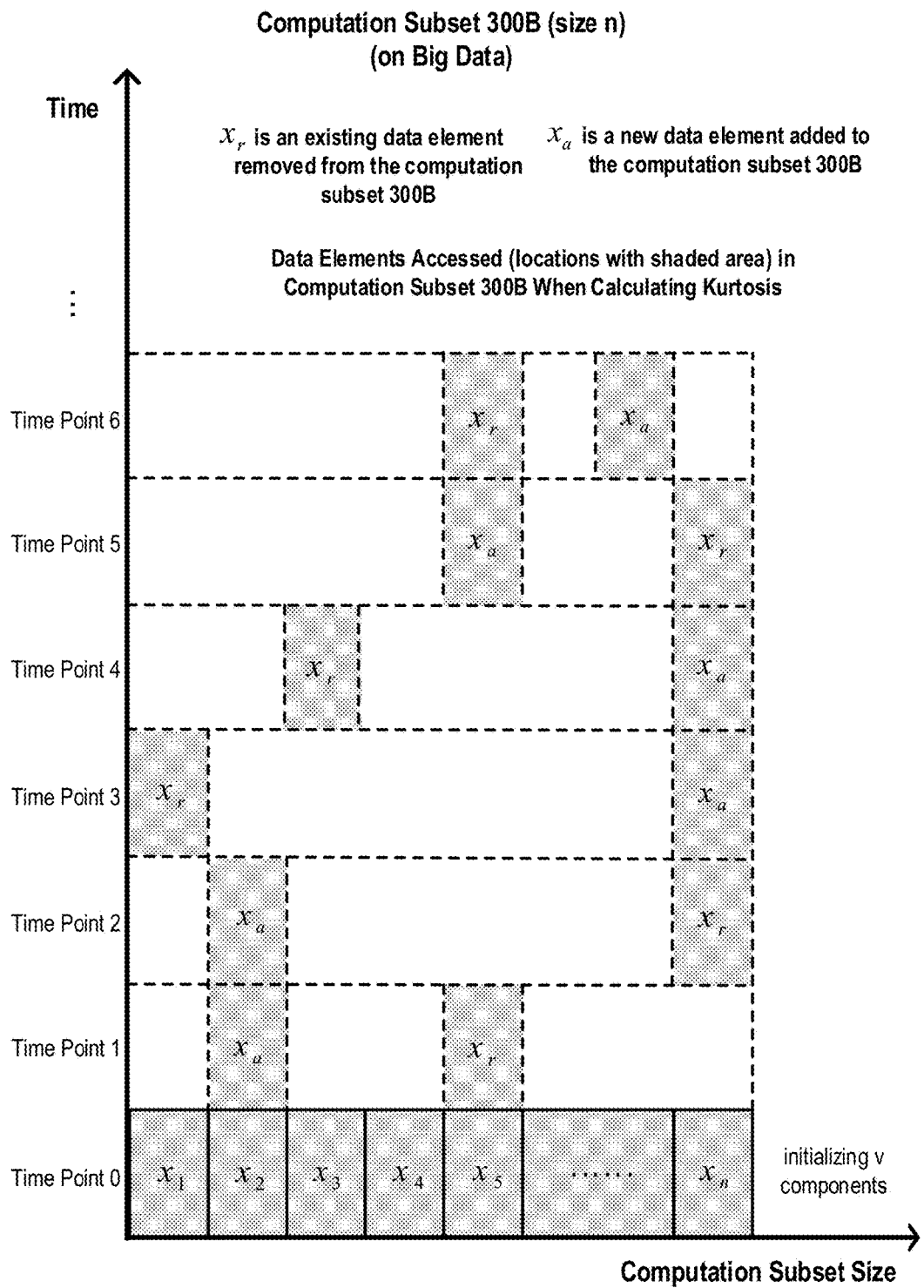
FIG. 3B illustrates the data elements that are accessed from a computation subset for iteratively calculating a kurtosis on Big Data.

FIG. 3B illustrates data that is accessed from a computation subset 300B for iteratively calculating a kurtosis on Big Data. Referring to FIG. 3B, an existing data element may be removed from any position (indicated by letter "r") of computation subset 300B and a newly accessed data element may be added to any position (indicated by letter "a") of computation subset 300B. For computation subset 300B, when initializing v components of a kurtosis, the first n data elements might be accessed for calculating v components of a kurtosis for the first computation subset. As time progresses, an existing data element removed from the computation subset 300B and a data element added to the computation subset 300B, are accessed for directly iteratively calculating v components for the modified computation subset, indirectly iteratively calculating w=p-v components, and calculating the kurtosis using one or more iteratively calculated components. The v components may be directly iteratively calculated from the data element removed, the data element added and the v components for the previous computation subset. For a given iterative algorithm, v is a constant, so the number of operations for directly iteratively calculating v components is a constant, and the number of operations for indirectly iteratively calculating w=p-v components is also a constant. Thus, after calculation of the p components for the first computation subset, computation workload is reduced and remains constant. The larger the n, the more substantial the reduction in computation workload.

FIG. 4A illustrates the definition of kurtosis. Suppose a computation subset $X=\{x_i|i=1, \ldots, n\}$ is a subset of a Big Data set which comprises the data elements to be involved in kurtosis calculation. Equation 401 is a traditional equation for calculating sum $S_k$ of all the data elements in X. Equation 402 is a traditional equation for calculating mean $\bar{x}_k$ of all the data elements in X. Equation 403 is a traditional equation for calculating kurtosis $\gamma_k^{(2)}$ of all the data elements in a computation subset of size n. Assuming the computation subset X of size n is changed with a data element $x_r$ being removed and a data element $x_a$ being added. Define the modified computation subset as X'. Equation 404 is a traditional equation for calculating sum $S_{k+1}$ of all the data elements in the modified computation subset X'. Equation 405 is a traditional equation for calculating mean $\bar{x}_{k+1}$ of all the data elements in the modified computation subset X'. Equation 406 is a traditional equation for calculating kurtosis $\gamma_k^{(2)}$ of all the data elements in the modified computation subset X'.

FIG. 4B illustrates some components of a kurtosis and basic iterative component calculation equations. A component of a kurotsis is a quantity or expression appearing in the kurtosis's definition equation or any transforms of the equation. The following are some example components of the kurtosis.

$$S_k = \sum_1^n x_i$$

$$\bar{x}_k = \frac{S_k}{n} = \frac{1}{n}\sum_1^n x_i$$

$$SS_k = \sum_1^n x_i^2$$

$$SX_k = \sum_1^n (x_i - \bar{x}_k)^2$$

$$CS_k = \sum_1^n x_i^3$$

$$CX_k = \sum_1^n (x_i - \bar{x}_k)^3$$

$$QS_k = \sum_1^n x_i^4$$

$$QX_k = \sum_1^n (x_i - \bar{x}_k)^4$$

$$\frac{1}{n}\sum_1^n (x_i - \bar{x}_k)^2$$

$$\frac{1}{n}\sum_1^n (x_i - \bar{x}_k)^3$$

$$\frac{1}{n}\sum_1^n (x_i - \bar{x}_k)^4$$

$$\left(\frac{1}{n}\sum_1^n (x_i - \bar{x}_k)^2\right)^2$$

$$\gamma_k^{(2)} = \frac{n\sum_1^n (x_i - \bar{x}_k)^4}{\left(\sum_1^n (x_i - \bar{x}_k)^2\right)^2}$$

A kurtosis may be calculated based on one or more components or combinations of them, so there are multiple algorithms supporting iterative kurtosis calculation. To illustrate how to use components to iteratively calculate kurtosis, three different iterative kurtosis calculation algorithms are given as examples. A new iteration of calculation is started each time there is a data change in the computation subset (e.g., 122→122A→122B). A sum or a mean is the basic component to be used for calculating a kurtosis. Equation 407 is for iteratively calculating a sum of all the data elements in the modified computation subset X'. Equation 408 is for iteratively calculating a mean of all the data elements in the modified computation subset X'. Either a sum or a mean will be used in all three iterative kurtosis calculation algorithms described later.

FIG. 4C illustrates the first example iterative kurtosis calculation algorithms (iterative algorithm 1). Iterative algorithm 1 comprises iterative calculation of components $S_{k+1}$ or $\bar{x}_{k+1}$, $SS_{k+1}$, $SX_{k+1}$, $CS_{k+1}$ and $QX_{k+1}$, and kurtosis $\gamma_{k+1}^{(2)}$ may be directly calculated as needed by using components $SX_{k+1}$ and $QX_{k+1}$ once they are calculated. Equation 407 may be used for directly iteratively calculating component $S_{k+1}$ if component $S_k$ is available. Equation 408 may be used for directly iteratively calculating component $\bar{x}_{k+1}$ if component $\bar{x}_k$ is available. Equation 409 is a traditional equation for calculating component $SS_k$ in the computation subset X. Equation 410 is a traditional equation for calculating component $SS_{k+1}$ in the modified computation subset X'. Equation 411 may be used for directly iteratively calculating component $SS_{k+1}$ in the modified computation subset X' if component $SS_k$ is available. Equation 412 is a traditional equation for calculating component $SX_k$ in the computation subset X. Equation 413 is a traditional equation for calculating component $SX_{k+1}$ in the modified computation subset X'. Equations 414 may be used for indirectly iteratively calculating component $SX_{k+1}$ in the modified computation subset X' if components $S_{k+1}$ and/or $\bar{x}_{k+1}$ and $SS_k$ are available. Equations 414 comprise multiple equations but only one of them is needed depending on if a sum or a mean or both are available. Equation 415 is a traditional equation for calculating component $CS_k$ in the computation subset X. Equation 416 is a traditional equation for calculating component $CS_{k+1}$ in the modified computation subset X'. Equation 417 may be used for directly iteratively calculating component $CS_{k+1}$ in the modified computation subset X' if component $CS_k$ is available. Equation 418 is a traditional equation for calculating component $QX_k$ in the computation subset X. Equation 419 is a traditional equation for calculating component $QX_{k+1}$ in the modified computation subset X'. Equations 420 may be used for indirectly iteratively calculating component $QX_{k+1}$ in the modified computation subset X' if components $QX_k$, $CS_k$, $SS_k$, $S_k$ or $\bar{x}_k$, and $S_{k+1}$ or $\bar{x}_{k+1}$ are available. Equations 420 comprise multiple equations but only one of them is needed depending on if a sum or a mean or both are available. Equation 421 may be used for indirectly iteratively calculating the kurtosis $\gamma_{k+1}^{(2)}$ for the modified computation subset X' once components $QX_{k+1}$ and $SX_{k+1}$ are calculated.

FIG. 4D illustrates the second example iterative kurtosis calculation algorithms (iterative algorithm 2). Iterative algorithm 2 comprises iterative calculation of components $S_{k+1}$ or $\bar{x}_{k+1}$, $SS_{k+1}$, $SX_{k+1}$, $CS_{k+1}$, $QS_{k+1}$ and $QX_{k+1}$, and kurtosis $\gamma_{k+1}^{(2)}$ may be directly calculated by using components $SX_{k+1}$ and $QX_{k+1}$ once they are calculated. Equation 407 may be used for directly iteratively calculating component $S_{k+1}$ if component $S_k$ is available. Equation 408 may be used for directly iteratively calculating component $\bar{x}_{k+1}$ if component $\bar{x}_k$ is available. Equation 422 is a traditional equation for calculating component $SS_k$ in the computation subset X. Equation 423 is a traditional equation for calculating component $SS_{k+1}$ in the modified computation subset X'. Equation 424 may be used for directly iteratively calculating component $SS_{k+1}$ in the modified computation subset X' if component $SS_k$ is available. Equations 424 remove contributions of $x_r$ from component $SS_k$ mathematically and add contributions of $x_a$ to component $SS_k$ mathematically to get component $SS_{k+1}$. Equation 425 is a traditional equation for calculating component $SX_k$ in the computation subset X. Equation 426 is a traditional equation for calculating component $SX_{k+1}$ in the modified computation subset X'. Equations 427 may be used for indirectly iteratively calculating component $SX_{k+1}$ in the modified computation subset X' if components $S_{k+1}$ and/or $\bar{x}_{k+1}$ and $SS_{k+1}$ are available. Equations 427 comprise multiple equations but only one of them is needed depending on if a sum or a mean or both are available. Equation 428 is a traditional equation for calculating component $CS_k$ in the computation subset X. Equation 429 is a traditional equation for calculating component $CS_{k+1}$ in the modified computation subset X'. Equation 430 may be used for iteratively calculating component $CS_{k+1}$ in the modified computation subset X' if component $CS_k$ is available. Equations 430 remove contributions of $x_r$ from component $CS_k$ mathematically and add contributions of $x_a$ to component $CS_k$ mathematically to get component $CS_{k+1}$. Equation 431 is a traditional equation for calculating component $QS_k$ in the computation subset X. Equation 432 is a traditional equation for calculating component $QS_{k+1}$ in the modified computation subset X'. Equation 433 may be used for directly iteratively calculating component $QS_{k+1}$ in the modified computation subset X' if component $QS_k$ is available. Equations 433 remove contributions of $x_r$ from component $QS_k$ mathematically and add contributions of $x_a$ to component $QS_k$ mathematically to get component $QS_{k+1}$. Equation 434 is a traditional equation for calculating component $QX_k$ in the computation subset X. Equation 435 is a traditional equation for calculating component $QX_{k+1}$ in the modified computation subset X'. Equations 436 may be used for indirectly iteratively calculating component $QX_{k+1}$ in the modified computation subset X' if components $QS_{k+1}$, $CS_{k+1}$, $SS_{k+1}$, and $S_{k+1}$ or $\bar{x}_{k+1}$ are available. Equations 436 comprise multiple equations but only one of them is needed depending on if a sum or a mean or both are available. Equation 437 may be used for indirectly iteratively calculating the kurtosis $\gamma_{k+1}^{(2)}$ for the modified computation subset X' once components $QX_{k+1}$ and $SX_{k+1}$ are calculated.

FIG. 4E illustrates the third example iterative kurtosis calculation algorithms (iterative algorithm 3). Iterative algorithm 3 comprises iterative calculation of components $S_{k+1}$ or $\bar{x}_{k+1}$, $SS_{k+1}$, $SX_{k+1}$, $CS_{k+1}$ and $QX_{k+1}$, and kurtosis $\gamma_{k+1}^{(2)}$ may be directly calculated by using components $SX_{k+1}$ and $QX_{k+1}$ once they are calculated. Equation 407 may be used for directly iteratively calculating component $S_{k+1}$ if component $S_k$ is available. Equation 408 may be used for directly iteratively calculating component $\bar{x}_{k+1}$ if component $\bar{x}_k$ is available. Equation 438 is a traditional equation for calculating component $SS_k$ in the computation subset X. Equation 439 is a traditional equation for calculating component $SS_{k+1}$ in the modified computation subset X'. Equation 440 may be used for directly iteratively calculating component $SS_{k+1}$ in the modified computation subset X' if component $SS_k$ is available. Equations 440 remove contributions of $x_r$ from $SS_k$ mathematically and add contributions of $x_a$ to $SS_k$ mathematically to get $SS_{k+1}$. Equation 441 is a traditional equation for calculating component $SX_k$ in the computation subset X. Equation 442 is a traditional equation for calculating component $SX_{k+1}$ in the modified computation subset X'. Equations 443 may be used for directly iteratively calculating component $SX_{k+1}$ in the modified computation subset X' if components $SX_k$, $S_k$ and $S_{k+1}$ or $\bar{x}_k$ and $\bar{x}_{k+1}$ are available. Equations 443 remove contributions of $x_r$ from component $SX_k$ mathematically and add contributions of $x_a$ to component $SX_k$ mathematically to get component $SX_{k+1}$. Equations 443 comprise multiple equations but only one of them is needed depending on if a sum or a mean is available. Equation 444 is a traditional equation for calculating component $CS_k$ in the computation subset X. Equation 445 is a traditional equation for calculating component $CS_{k+1}$ in the modified computation subset X'. Equation 446 may be used for directly iteratively calculating component $CS_{k+1}$ in the modified computation subset X'. Equation 446 remove contributions of $x_r$ from component $CS_k$ mathematically and add contributions of $x_a$ to component $CS_k$ mathematically to get component $CS_{k+1}$. Equation 447 is a traditional equation for calculating component $QS_k$ in the computation subset X. Equation 448 is a traditional equation for calculating component $QS_{k+1}$ in the modified computation subset X'. Equation 449 may be used for directly iteratively calculating component $QS_{k+1}$ in the modified computation subset X'. Equation 449 remove contributions of $x_r$ from component $QS_k$ mathematically and add contributions of $x_a$ to component $QS_k$ mathematically to get $QS_{k+1}$. Equation 450 is a traditional equation for calculating component $QX_k$ in the computation subset X. Equation 451 is a traditional equation for calculating component $QX_{k+1}$ in the modified computation subset X'. Equations 452 may be used for indirectly iteratively calculating component $QX_{k+1}$ in the modified computation subset X' if components $QS_{k+1}$, $CS_{k+1}$, $SS_{k+1}$, and $S_{k+1}$ or $\bar{x}_{k+1}$ are available. Equations 452 comprise multiple equations but only one of them is needed depending on if a sum or a mean or both are available. Equation 453 may be used for indirectly iteratively calculating the kurtosis $\gamma_{k+1}^{(2)}$ for the modified computation subset X' once components $QX_{k+1}$ and $SX_{k+1}$ are calculated.

FIG. 5A illustrates an example of calculating a kurtosis for Big Data set 501 using traditional algorithms. Big Data set 501 is a Big Data set. Computation subset size 502 ($n$) is 4, which is the same for all computation subsets. Computation subset 503 includes the first four data elements in Big Data set 501. There are a total of 2 divisions, 14 multiplications, 9 additions, 8 subtractions when calculating the kurtosis $\gamma_1^{(2)}$ on 4 data elements without any optimization.

The same equations may be used for calculating the kurtosis for computation subset 504 as shown in FIG. 5A Cont'd 1 and the kurtosis for computation subset 505 as shown in FIG. 5A Cont'd 2 respectively. Each of these calculations also includes a total of 2 divisions, 14 multiplications, 9 additions, 8 subtractions when calculating the kurtosis $\gamma_2^{(2)}$ and the kurtosis $\gamma_3^{(2)}$ respectively on 4 data elements without any optimization. Traditional algorithms for calculating kurtosis on a computation subset of n data elements will typically take 2 divisions, 3n+2 multiplications, 3(n−1) additions, and 2n subtractions without any optimization.

FIG. 5B illustrates an example of calculating kurtosis on Big Data set 501 using iterative algorithm 1 as shown in FIG. 4C. A mean instead of a sum is used in this example. The calculations for computation subset 503 uses traditional equations to calculate the initial values of components $\bar{x}_1$, $SS_1$, $SX_1$, $CS_1$ and $QX_1$. The kurtosis of computation subset 503 $\gamma_1^{(2)}$ is then calculated based on components $QX_1$ and $SX_1$. There are a total of 2 divisions, 26 multiplications, 15 additions and 8 subtractions when calculating the kurtosis.

However, for subset 504, the components of the kurtosis for computation subset 504 may be iteratively calculated from the components of the kurtosis for computation subset 503. For example, equation 408 may be used for iteratively calculating the component $\bar{x}_2$ based on $\bar{x}_1$ previously calculated for computation subset 503 along with removing any contribution of $x_r$ and adding a contribution of $x_a$. Equation 411 may be used for iteratively calculating the component $SS_2$ based on $SS_1$ previously calculated for computation subset 503 along with removing any contribution of $x_r$ and adding a contribution of $x_a$. Equation 414 may be used for iteratively calculating the component $SX_2$ based on components $SS_2$ and $\bar{x}_2$. Equation 417 may be used for iteratively calculating the component $CS_2$ based on $CS_1$ previously calculated for computation subset 503 along with removing any contribution of $x_r$ and adding a contribution of $x_a$. Equation 420 may be used for iteratively calculating the component $QX_2$ based on components $x_1$, $QX_1$, $SS_1$, $CS_1$ previously calculated for computation subset 503 and $\bar{x}_2$ along with removing any contribution of $x_r$ and adding a contribution of $x_a$. Equation 421 may be used for calculating the kurtosis $\gamma_2^{(2)}$ based on components $QX_2$ and $SX_2$. There are a total of 2 divisions, 22 multiplications, 9 additions and 10 subtractions when calculating the kurtosis.

The same equations may also be used for iteratively calculating the components of kurtosis for computation subset 505 from the components of kurtosis for computation subset 504. There are a total of 2 divisions, 22 multiplications, 9 additions and 10 subtractions when iteratively calculating the kurtosis $\gamma_3^{(2)}$. As such, starting from computation subset 504, the number of operations used when iteratively calculating the kurtosis is (potentially substantially) less than when using traditional equations.

FIG. 5C illustrates an example of calculating a kurtosis using iterative algorithm 2 as shown in FIG. 4D. A mean instead of a sum is used in this example. The calculations for computation subset 503 uses traditional equations to calculate the initial values of components $\bar{x}_1$, $SS_1$, $SX_1$, $CS_1$, $QS_1$ and $QX_1$. For example, equation 402 may be used for calculating component $\bar{x}_1$. Equation 422 may be used for calculating component $SS_1$. Equation 425 may be used for calculating component $SX_1$. Equation 428 may be used for calculating component $CS_1$. Equation 431 may be used for calculating component $QS_1$. Equation 434 may be used for calculating component $QX_1$. The kurtosis $\gamma_1^{(2)}$ of computation subset 503 is then calculated by using components $QX_1$ and $SX_1$ through equation 437. There are a total of 2 divisions, 30 multiplications, 18 additions and 8 subtractions when calculating the kurtosis $\gamma_1^{(2)}$.

However, for subset 504, the components of the kurtosis for computation subset 504 may be iteratively calculated from the components of the kurtosis for computation subset 503. For example, equation 408 may be used for iteratively calculating the component $\bar{x}_2$ based on component $\bar{x}_1$ previously calculated for computation subset 503 along with removing any contribution of $x_r$ and adding a contribution of $x_a$. Equation 424 may be used for iteratively calculating the component $SS_2$ based on component $SS_1$ previously calculated for computation subset 503 along with removing any contribution of $x_r$ and adding a contribution of $x_a$. Equation 427 may be used for iteratively calculating the component $SX_2$ based on components $SS_2$ and $\bar{x}_2$. Equation 430 may be used for iteratively calculating component $CS_2$ based on component $CS_1$ previously calculated for computation subset 503 along with removing any contribution of $x_r$ and adding a contribution of $x_a$. Equation 433 may be used for iteratively calculating component $QS_2$ based on component $QS_1$ previously calculated for computation subset 503 along with removing any contribution of $x_r$ and adding a contribution of $x_a$. Equation 436 may be used for iteratively calculating the component $QX_2$ based on components $\bar{x}_2$, $QS_2$, $CS_2$, and $SS_2$. Equation 437 may then be used for calculating the kurtosis $\gamma_2^{(2)}$ based on components $QX_2$ and $SX_2$. There are a total of 2 divisions, 16 multiplications, 5 additions and 7 subtractions when calculating the kurtosis $\gamma_2^{(2)}$.

The same equations may also be used for iteratively calculating the components of kurtosis for computation subset 505 from the components of kurtosis for computation subset 504. There are a total of 2 divisions, 16 multiplications, 5 additions and 7 subtractions when iteratively calculating the kurtosis $\gamma_3^{(2)}$. As such, starting from computation subset 504, the number of operations used when iteratively calculating the kurtosis is (potentially substantially) less than when using traditional equations.

FIG. 5D illustrates an example of calculating a kurtosis using iterative algorithm 3 as shown in FIG. 4E. A mean instead of a sum is used in this example. The calculations for computation subset 503 uses traditional equations to calculate the initial values of components $\bar{x}_1$, $SS_1$, $SX_1$, $CS_1$, $QS_1$ and $QX_1$. For example, equation 402 may be used for calculating component $\bar{x}_1$. Equation 438 may be used for calculating component $SS_1$. Equation 441 may be used for calculating component $SX_1$. Equation 444 may be used for calculating component $CS_1$. Equation 447 may be used for calculating component $QS_1$. Equation 450 may be used for calculating component $QX_1$. Equation 453 may then be used for calculating the kurtosis $\gamma_1^{(2)}$ of computation subset 503 based on components $QX_1$ and $SX_1$. There are a total of 2 divisions, 30 multiplications, 18 additions and 8 subtractions when calculating the kurtosis $\gamma_1^{(2)}$.

However, for subset 504, the components of the kurtosis for computation subset 504 may be iteratively calculated from the components of the kurtosis for computation subset 503. For example, equation 408 may be used for iteratively calculating the component $\bar{x}_2$ based on component $\bar{x}_1$ previously calculated for computation subset 503. Equation 440 may be used for iteratively calculating the component $SS_2$ based on component $SS_1$ previously calculated for computation subset 503. Equation 443 may be used for iteratively calculating the component $SX_2$ based on components $SX_1$, $\bar{x}_1$ and $\bar{x}_2$ along with removing any contribution of $x_r$ and adding a contribution of $x_a$. Equation 446 may be used for iteratively calculating component $CS_2$ based on component $CS_1$ previously calculated for computation subset 503 along with removing any contribution of $x_r$ and adding a contribution of $x_a$. Equation 449 may be used for iteratively calculating component $QS_2$ based on component $QS_1$ previously calculated for computation subset 503 along with removing any contribution of $x_r$ and adding a contribution of $x_a$. Equation 452 may be used for iteratively calculating the component $QX_2$ based on components $\bar{x}_2$, $QS_2$, $CS_2$, and $SS_2$. Equation 453 may then be used for calculating the kurtosis $\gamma_2^{(2)}$ based on components $QX_2$ and $SX_2$. There are a total of 2 divisions, 16 multiplications, 8 additions and 8 subtractions when calculating the kurtosis $\gamma_2^{(2)}$.

The same equations may also be used for iteratively calculating the components of kurtosis for computation subset 505 from the components of kurtosis for computation subset 504. There are a total of 2 divisions, 16 multiplications, 8 additions and 8 subtractions when iteratively calculating the kurtosis $\gamma_3^{(2)}$. As such, starting from computation subset 504, the number of operations used when iteratively calculating the kurtosis is (potentially substantially) less than when using traditional equations.

In the above three examples, a mean is used for the iterative kurtosis calculation. If a sum instead of a mean is used, kurtosis may also be iteratively calculated though the numbers of operations are different.

FIG. 6 illustrates computational loads for traditional kurtosis algorithm and iterative kurtosis algorithms for n=4 for computation subset 505. As depicted, there are fewer multiplication operations, fewer addition operations, and fewer subtraction operations using any one of the iterative algorithms.

FIG. 7 illustrates computational loads for traditional kurtosis algorithm and iterative kurtosis algorithm for n=1,000,000 for any computation subset other than the first computation subset. Again, as depicted, there are fewer multiplication operations, fewer addition operations, and fewer subtraction operations using any one of the iterative algorithms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing-system-implemented method for generating a kurtosis for data elements in a modified computation subset, the method comprising:
   initializing, by a computing-device-based computing system, a sum or an average or both for a pre-modified computation subset of a data set on one or more storage media of the computing-device-based computing system, and one or more other components of a kurtosis for the pre-modified computation subset, wherein the pre-modified computation subset contains a specified number, n (n≥10), of data elements of the data set;
   accessing, by the computing-device-based computing system, a data element to be removed from the pre-modified computation subset and a data element to be added to the pre-modified computation subset;
   modifying, by computing-device-based computing system, the pre-modified computation subset by:
      removing the to be removed data element from the pre-modified computation subset; and
      adding the to be added data element to the pre-modified computation subset;
   iteratively deriving, by the computing-device-based computing system, a sum or an average or both for the modified computation subset;
   directly iteratively deriving, by the computing-device-based computing system and based at least in part on the one or more components of the kurtosis other than a sum and an average initialized or derived for the pre-modified computation subset, one or more components of a kurtosis other than a sum and an average for the modified computation subset, wherein the directly iteratively deriving includes:
      accessing the one or more components of the kurtosis other than a sum and an average for the pre-modified computation subset without accessing all data elements in the modified computation subset to reduce data accessing latency thereby saving computing resources and reducing the computing-device-based computing system's power consumption; and
      removing any contribution of the removed data element from each of the accessed components mathematically and adding any contribution of the added data element to each of the accessed components mathematically without using all data elements in the modified computation subset to reduce the number of operations performed by the computing-device-based computing system thereby increasing calculation efficiency; and
   generating, by the computing-device-based computing system, a kurtosis for the modified computation subset based on one or more of the iteratively derived components.

2. The computing-system-implemented method of claim 1, wherein the generating a kurtosis further comprises indirectly iteratively deriving, by the computing-device-based computing system, one or more components of the kurtosis for the modified computation subset, wherein the indirectly iteratively deriving the one or more components includes individually calculating each respective one of the one or more components based on one or more components other than the respective one component.

3. The computing-system-implemented method of claim 1, wherein the accessing a data element to be removed from the computation subset and a data element to be added to the computation subset includes accessing a plurality of z data elements to be removed and a plurality of z data elements to be added, and wherein the method further comprises performing, for each of the respective z data elements to be removed and each of the respective z data elements to be added, the modifying the pre-modified computation subset, the iteratively deriving a sum or an average or both for the modified computation subset, the directly iteratively deriving the one or more components of a kurtosis for the modified computation subset, and the generating a kurtosis for the modified computation subset.

4. The computing-system-implemented method of claim 3, wherein the generating a kurtosis for the modified computation subset comprises generating a kurtosis for the modified computation subset only when the kurtosis is accessed.

5. The computing-system-implemented method of claim 4, wherein the generating a kurtosis for the modified computation subset further comprises indirectly iteratively deriving, by the computing-device-based computing system, one or more components of the kurtosis for the modified computation subset, wherein the indirectly iteratively deriving the one or more components includes individually calculating each respective one of the one or more components based on one or more components other than the respective one component.

6. The computing-system-implemented method of claim 1, wherein the accessing a data element to be removed from the computation subset and a data element to be added to the computation subset includes accessing a plurality of z data elements to be removed and a plurality of z data elements to be added, and wherein the method further comprises performing, for each of the respective z data elements to be removed and each of the respective z data elements to be added, the modifying the pre-modified computation subset, the iteratively deriving a sum or an average or both for the modified computation subset, and the directly iteratively deriving the one or more components of a kurtosis for the modified computation subset.

7. The computing-system-implemented method of claim 1, wherein the removing any contribution of the removed data element from each of the accessed components mathematically and the adding any contribution of the added data element to each of the accessed components mathematically without using all data elements in the modified computation subset comprises removing any contribution of the removed data element from each of the accessed components mathematically and adding any contribution of the added data element to each of the accessed components mathematically without using any data element other than the removed data element and the added data element.

8. A computing system, the computing system comprising:
   one or more computing devices;
   each computing device comprising one or more processors;
   one or more storage media; and
   one or more calculation units that, when executed by at least one of the one or more computing devices, determine a kurtosis for a modified computation subset, the one or more calculation units configured to:
   a. initialize a sum or an average or both for a pre-modified computation subset of a data set on at least one of the one or more storage media, and one or more other components of a kurtosis for the pre-modified computation subset, wherein the pre-modified computation subset contains a specified number, n (n≥10), of data elements of the data set;
b. access a data element to be removed from the pre-modified computation subset and a data element to be added to the pre-modified computation subset;
c. modify the pre-modified computation subset, wherein modification of the pre-modified computation subset includes to remove the to-be-removed data element from the pre-modified computation subset and to add the to-be-added data element to the pre-modified computation subset;
d. iteratively calculate a sum or an average or both for the modified computation subset;
e. directly iteratively calculate one or more components of a kurtosis other than a sum and an average for the modified computation subset based at least in part on the one or more components of the kurtosis other than a sum and an average initialized or calculated for the pre-modified computation subset, wherein iterative calculation of the one or more components includes to remove any contribution of the removed data elements from each of the one or more components mathematically and to add any contribution of the added data element to each of the one or more components mathematically without accessing and using all data elements in the modified computation subset to reduce data access latency and the number of operations performed by the computing system, thereby increasing calculation efficiency, saving computing resources and reducing the computing system's power consumption; and
f. generate a kurtosis for the modified computation subset based on one or more of the iteratively calculated components.

9. The computing system of claim 8, wherein the generating a kurtosis for the modified computation subset further comprises indirectly iteratively calculate one or more components of a kurtosis for the modified computation subset, wherein indirectly iteratively calculating one or more components includes individually calculating each respective one of the one or more components based on one or more components other than the respective one component.

10. A computing system of claim 8, wherein the one or more calculation units that, when executed by at least one of the one or more computing devices, performing b, c, d, e, and f multiple times.

11. The computing system of claim 10, wherein the performing f comprises generating a kurtosis for the modified computation subset only when the kurtosis is accessed.

12. The computing system of claim 11, wherein the generating a kurtosis further comprises indirectly iteratively calculating one or more components of the kurtosis for the modified computation subset, wherein indirectly iteratively calculating one or more components includes individually calculating each respective one of the one or more components based on one or more components other than the respective one component.

13. The computing system of claim 8, wherein the one or more calculation units that, when executed by at least one of the one or more computing devices, performing b, c, d, and e multiple times.

14. The computing system of claim 8, wherein the removing any contribution of the removed data elements from each of the one or more components mathematically and the adding any contribution of the added data element to each of the one or more components mathematically without accessing and using all data elements in the modified computation subset comprises removing any contribution of the removed data element from each of the one or more components mathematically and adding any contribution of the added data element to each of the one or more components mathematically without accessing and using any data element other than the removed data element and the added data element.

15. A computing system program product for use at a configured computing system that comprises one or more computing devices and one or more storage media, each computing device comprising one or more processors, the computing system program product comprising one or more non-transitory computing-device-readable storage media having stored thereon computing-device-executable instructions that, when executed by at least one of the one or more computing devices in the configured computing system, cause the configured computing system to perform a method for generating a kurtosis for data elements in a modified computation subset, the method including steps to:
initialize, by a configured computing system, a sum or an average or both for a pre-modified computation subset of a data set on one or more storage media of the configured computing system, and one or more other components of a kurtosis for the pre-modified computation subset, wherein the pre-modified computation subset contains a specified number, n(n≥10), of data elements of the data set;
access, by the configured computing system, a data element to be removed from the pre-modified computation subset and a data element to be added to the pre-modified computation subset;
modify, by the configured computing system, the pre-modified computation subset by removing the to be removed data element from the pre-modified computation subset and adding the to be added data element to the pre-modified computation subset;
iteratively calculate, by the configured computing system, a sum or an average or both for the modified computation subset;
directly iteratively calculate, by the configured computing system and based at least in part on the one or more components of the kurtosis other than a sum and an average initialized or calculated for the pre-modified computation subset, one or more components of a kurtosis other than a sum and an average for the modified computation subset, wherein the directly iteratively calculating includes to:
access the one or more components of the kurtosis other than a sum and an average initialized or calculated for the pre-modified computation subset without accessing all data elements in the modified computation subset to reduce data accessing latency thereby saving computing resources and reducing the configured computing system's power consumption; and
remove any contribution of the removed data element from each of the accessed components mathematically and adding any contribution of the added data element to each of the accessed components mathematically without using all data elements in the modified computation subset to reduce the number of operations performed by the configured computing system thereby increasing calculation efficiency; and generate, by the configured computing system, a kurtosis for the modified computation subset based on one or more of the iteratively calculated components.

16. The computing system program product of claim 15, wherein the generating a kurtosis further comprises indirectly iteratively calculating, by the configured computing system, one or more components of the kurtosis for the modified computation subset, wherein indirectly iteratively calculating the one or more components includes individually calculating each respective one of the one or more components based on one or more components other than the respective one component.

17. The computing system program product of claim 15, wherein the computing-device-executable instructions that, when executed, further cause the configured computing system to access a data element to be removed from the pre-modified computation subset and a data element to be added to the pre-modified computation subset, to modify the pre-modified computation subset, to iteratively calculate a sum or an average or both for the modified computation subset, to directly iteratively calculate the one or more components of a kurtosis other than a sum and an average, and to generate a kurtosis for the modified computation subset for each of multiple data elements to be accessed.

18. The computing system program product of claim 17, wherein the generating a kurtosis for the modified computation subset comprises generating a kurtosis for the modified computation subset only when the kurtosis is accessed.

19. The computing system program product of claim 18, wherein the generating a kurtosis for the modified computation subset further comprises indirectly iteratively calculating, by the configured computing system, one or more components of the kurtosis for the modified computation subset, wherein indirectly iteratively calculating the one or more components includes individually calculating each respective one of the one or more components based on one or more components other than the respective one component.

20. The computing system program product of claim 15, wherein the computing-device-executable instructions that, when executed, further cause the configured computing system to access a data element to be removed from the pre-modified computation subset and a data element to be added to the pre-modified computation subset, to modify the pre-modified computation subset, to iteratively calculate a sum or an average or both for the modified computation subset, and to directly iteratively calculate the one or more components of a kurtosis other than a sum and an average for the modified computation subset for each of multiple data elements to be accessed.

* * * * *